United States Patent
Cui et al.

(10) Patent No.: US 12,501,383 B2
(45) Date of Patent: Dec. 16, 2025

(54) ENHANCED RADIO RESOURCE MANAGEMENT MEASUREMENTS

(71) Applicant: Apple Inc., Cupertino, CA (US)

(72) Inventors: Jie Cui, San Jose, CA (US); Panagiotis Botsinis, Munich (DE); Sameh M Eldessoki, Munich (DE); Tarik Tabet, Carlsbad, CA (US); Christian Hofmann, Munich (DE); Manasa Raghavan, Sunnyvale, CA (US); Qiming Li, Sunnyvale, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/042,854

(22) PCT Filed: Mar. 5, 2022

(86) PCT No.: PCT/CN2022/079442
§ 371 (c)(1),
(2) Date: Feb. 24, 2023

(87) PCT Pub. No.: WO2023/168543
PCT Pub. Date: Sep. 14, 2023

(65) Prior Publication Data
US 2024/0284357 A1    Aug. 22, 2024

(51) Int. Cl.
*H04W 56/00* (2009.01)
*H04B 7/06* (2006.01)
*H04W 16/28* (2009.01)

(52) U.S. Cl.
CPC ...... *H04W 56/0015* (2013.01); *H04B 7/0617* (2013.01); *H04B 7/06968* (2023.05); *H04W 16/28* (2013.01)

(58) Field of Classification Search
CPC .............. H04W 56/0015; H04W 16/28; H04B 7/0617; H04B 7/06952
See application file for complete search history.

(56) References Cited

U.S. PATENT DOCUMENTS

2020/0413356 A1* 12/2020 Wang ................ H04W 74/0808
2021/0376907 A1   12/2021 Zhu et al.

FOREIGN PATENT DOCUMENTS

| CN | 111200868 A | 5/2020 |
| CN | 112567775 A | 3/2021 |
| WO | 2019242026 A1 | 12/2019 |

OTHER PUBLICATIONS

International Preliminary Report on Patentability dated Sep. 10, 2024 in connection with Application No. PCT/CN2022/079442.
(Continued)

*Primary Examiner* — Jamal Javaid
(74) *Attorney, Agent, or Firm* — Eschweiler & Potashnik, LLC; Matthew Glause

(57) ABSTRACT

Techniques discussed herein can facilitate enhanced radio resource management measurements for wireless technology including New Radio (NR). One example aspect is a baseband processor of a user equipment (UE), including one or more processors configured to receive a measurement link information state link information. The one or more processors are further configured to determine, from the measurement link information, a number of synchronization signal block based measurement timing configurations (SMTCs) (Y) per Rx beam of a number of receive (Rx) beams (N); generate at least one of a subset number of Rx beams ($N_{UE}$) of the number of Rx beams based on the measurement link information, or an increased number of SMTCs ($Y_{UE}$) of the number of SMTCs corresponding to the number of Rx beams; and perform radio resource management (RRM)

(Continued)

measurements according to one or more of the subset number of Rx beams or the increased number of SMTCs.

20 Claims, 14 Drawing Sheets

(56) References Cited

OTHER PUBLICATIONS

3rd Generation Partnership Project; Technical Specification Group Radio Access Network; NR; Radio Resource Control (RRC) protocol specification (Release 16); 3GPP TS 38.331 V16.7.0; Dec. 2021.
WF on work plan for REI-17 FeMIMO RRM; 3GPP TSG-RAN WG4 Meeting #99-e; Electronic Meeting; 1Agenda Item: 9.18.1; R4-2108358; May 19, 2021.
Intel; WF on RRM impact for unified TCI in FeMIMO; 3GPP TSG-RAN WG4 Meeting # 101-e; R4-2120320; Nov. 1, 2021.
Moderator (Samsung); WF on FeMIMO RRM requirements for inter-cell beam management; 3GPP TSG-RAN WG4 Meeting # 101-e; R4-2120321; Nov. 1, 2021.
Samsung; WF on RRM impact on unified TCI in FeMIMO; 3GPP TSG-RAN WG4 Meeting # 101-bis-e; R4-2202666; Jan. 17, 2022.
Huawei, HiSilicon; WF on other RRM requirements for FeMIMO; 3GPP TSG-RAN WG4 Meeting #101bis-e; R4-2202668; Jan. 17, 2022.
Samsung; WF on FeMIMO RRM requirements for inter-cell beam management; 3GPP TSG-RAN WG4 Meeting #101-bis-e; R4-2202772; Jan. 17, 2022.
PCT Search Report and Written Opinion dated Nov. 30, 2022 in connection with Application Serial No. PCT/CN2022/079442.
Huawei et al.; "Discussion on SSB based inter-frequency measurement requirements"; 3GPP TSG-RAN WG4 Meeting #86; R4-1802637; Mar. 2, 2018.
3rd Generation Partnership Project; Technical Specification Group Radio Access Network; NR; Requirements for support of radio resource management; (Release 17);Cover; 3GPP TS 38.133 V17.4.0; Dec. 2021.
3rd Generation Partnership Project; Technical Specification Group Radio Access Network; NR; Requirements for support of radio resource management; (Release 17)s0-11; 3GPP TS 38.133 V17.4.0; Dec. 2021.
3rd Generation Partnership Project; Technical Specification Group Radio Access Network; NR; Requirements for support of radio resource management; (Release 17)sA-A.5; 3GPP TS 38.133 V17.4.0; Dec. 2021.
3rd Generation Partnership Project; Technical Specification Group Radio Access Network; NR; Requirements for support of radio resource management; (Release 17)sA.6-A.13; 3GPP TS 38.133 V17.4.0; Dec. 2021.
3rd Generation Partnership Project; Technical Specification Group Radio Access Network; NR; Requirements for support of radio resource management; (Release 17)sB.1-XX; 3GPP TS 38.133 V17.4.0; Dec. 2021.

* cited by examiner

|  Rx1  |  Rx2  |  Rx3  |  Rx4  |  Rx5  |  Rx6  |  Rx7  |  RxM  |
|-------|-------|-------|-------|-------|-------|-------|-------|
| SMTC1 | SMTC1 | SMTC1 | SMTC1 | SMTC1 | SMTC1 | SMTC1 | SMTC1 |
| SMTC2 | SMTC2 | SMTC2 | SMTC2 | SMTC2 | SMTC2 | SMTC2 | SMTC2 |
| ⋮ | ⋮ | ⋮ | ⋮ | ⋮ | ⋮ | ⋮ | ⋮ |
| SMTCG | SMTCG | SMTCG | SMTCG | SMTCG | SMTCG | SMTCG | SMTCG |
|  |  |  | ⋮ | ⋮ | ⋮ |  |  |
|  |  |  | SMTCi | SMTCi | SMTCi |  |  |

*FIG. 4*

ENHANCED RADIO RESOURCE MANAGEMENT MEASUREMENTS

FIELD

The present disclosure relates to wireless technology including New Radio (NR) radio enhanced resource management (RRM) measurements.

BACKGROUND

Mobile communication in the next generation wireless communication system, 5G, or new radio (NR) network will provide ubiquitous connectivity and access to information, as well as the ability to share data, around the globe. 5G networks and network slicing will be a unified, service-based framework, that will target to meet versatile, and sometimes conflicting, performance criteria. 5G networks will provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

BRIEF DESCRIPTION OF THE DRAWINGS

FIG. 4 illustrates a table Rx beams and SMTCs for user equipment (UE) radio resource management (RRM) measurements associated with FIG. 3.

Figure 1:
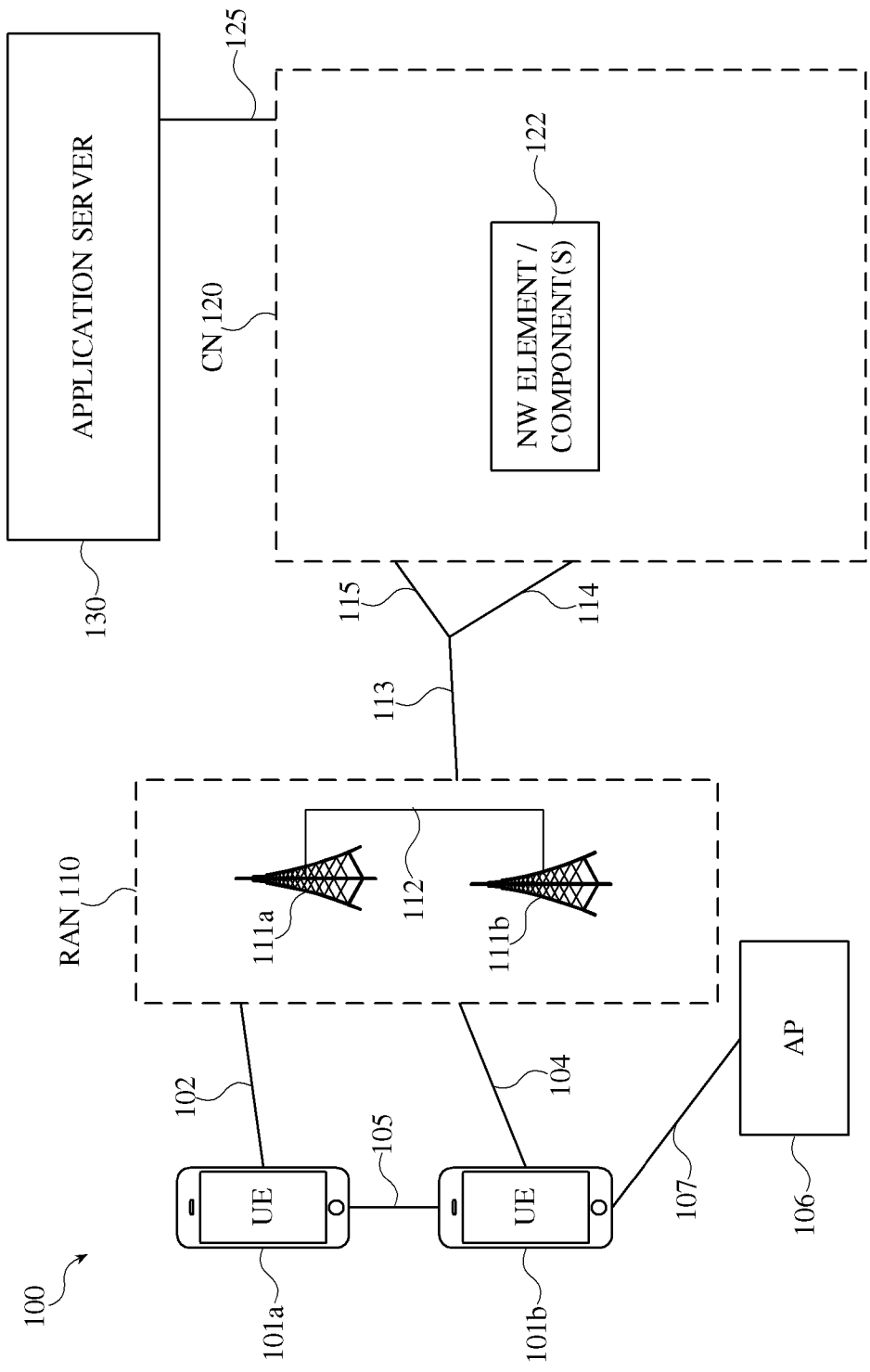
FIG. 1 is an exemplary block diagram illustrating an example of user equipment(s) (UEs) communicatively coupled to a network in accordance with various aspects described herein.

DETAILED DESCRIPTION 5G or NR networks may use beam sweeping procedures to determine which receive (Rx) beam of a user equipment (UE) is best per cell. Beam sweeping procedures can be performed according to layer 1 (L1) protocols (e.g. L1 reference signal received power (RSRP)) or layer 3 (L3) protocols (e.g. L3 radio resource management (RRM) measurements). In some aspects, the UE receives a measurement link information indicating a beam or a transmission configuration indicator (TCI) state associated with a synchronization signal block (SSB) of a serving base station (BS) and an associated BS. The measurement link information can be based on a quasi-co-located (QCLed) relationship between the serving BS and the associated BS. The UE 101 can configure beam sweeping procedures according to the QCLed information indicated by the measurement link information to perform more efficient measurements by reusing QCLed resources of the serving BS or the associated BS. The UE can perform beam sweeping according to a number of Rx beams and a number of synchronization signal block (SSB) based measurement timing configurations (SMTCs) per beam of the number of Rx beams.

In some aspects, the UE performs beam sweeping according to configured beams of the UE. However, some Rx beams may not detect Tx beams of the serving BS or associated BS because one or more Rx beams may be unusable due to panel blockage, panel overheating, an orientation of the UE, or the like. In such aspects, the UE configures SMTC measurement occasions on sub-optimal Rx beams. As such, the UE may waste measurement resources on Rx beams that are disadvantageous for a beam sweeping procedure. Furthermore, network resources are consumed thus reducing throughput and power is consumed.

Various aspects of the present disclosure are directed towards enhanced measurements for beam sweeping procedures, for example, enhanced L1 measurements or enhanced RRM measurements. Mechanisms by which the UE can autonomously reduce power consumption or enhance measurement quality by adjusting the number of Rx beams configured for measurement or by adjusting the number of SMTC occasions are presented herein. Mechanisms by which the serving BS can configure faster measurement reporting of the UE or improve system throughput by adjusting the measurement period based on QCLed resources are presented herein. Mechanisms by which the UE can prioritize the Rx beams and configure SMTC occasions for the prioritized Rx beams to improve measurement quality is presented herein. Mechanisms by which the UE can leverage QCLed resources to autonomously reduce Rx beam sweeping or improve beam refinement based on L1 measurements are presented herein. As such, the mechanisms presented herein describe methods to configure Rx beams and associated SMTC measurement occasions based on QCLed resources between the serving BS and the associated BS. The UE or network resources are conserved, or performance metrics such as measurement quality or system throughput are improved considering sub-optimal Rx beams.

FIG. 1 illustrates example architecture of a wireless communication system 100 of a network that includes UE 101a and UE 101b (collectively referred to as "UEs 101" or "UE 101"), a radio access network (RAN) 110, and a core network (CN) 120. The UEs communicate with the CN 120 by way of the RAN 110. In aspects, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communication interface/layer. Channels 102 and 104 can facilitate one or more of licensed or unlicensed communication bands between the UE 101 and the RAN 110.

Accordingly, the UE 101 can receive the measurement link information indicating the beam or the TCI state by connections 102 or 104. The BS can receive a measurement report based on the measurement link information by connections 102 or 104.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111a, 111b, 112, or other network nodes) that can be connected via non-ideal backhaul, one providing NR access and the other one providing either E-UTRA for LTE or NR access for 5G, for example.

Alternatively, or additionally, each of the UEs 101 can be configured in a CA mode where multiple frequency bands are aggregated amongst component carriers (CCs) to increase the data throughput between the UEs 101 and the nodes 111a, 111b. For example, UE 101a can communicate with node 111a according to the CCs in CA mode. Furthermore, UE 101a can communicate with nodes 112 in a DC mode simultaneously and additionally communicate with each node of nodes 112 in the CA mode.

In this example, the connections 102 and 104 are illustrated as an air interface to enable communicative coupling. In aspects, the UEs 101 can directly exchange communication data via a ProSe interface 105. The ProSe interface 105 can alternatively be referred to as a sidelink (SL) interface 105 and can comprise one or more logical channels. In other aspects, the ProSe interface 105 can be a direct (peer-to-peer) communication.

The RAN 110 can include one or more access nodes or RAN nodes 111a and 111 b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as a base station (BS), next generation base station (gNBs), RAN nodes, evolved next generation base station (eNBs), NodeBs, RSUs, Transmission Reception Points (TRxPs) or TRPs, and so forth.

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120.

The UE 101 and the RAN node 111 may utilize a Uu interface to exchange control plane data via a protocol stack comprising the PHY layer 201 (e.g., layer 1 (L1)), the MAC layer 202 (e.g., layer 2 (L2)), the RLC layer 203, the PDCP layer 204, and the RRC layer 205 (e.g., layer 3 (L3)). The Uu interface can be one or more of connections 102 and 104.

In aspects, the CN 120 can be a 5GC (referred to as "5GC 120" or the like), and the RAN 110 can be connected with the CN 120 via a next generation (NG) interface 113. In embodiments, the NG interface 113 can be split into two parts, a NG user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs).

In aspects, where CN 120 is an evolved packet core (EPC) (referred to as "EPC 120" or the like), the RAN 110 can be connected with the CN 120 via an S1 interface 113. In embodiments, the S1 interface 113 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

The UE 101 can perform a beam sweeping procedure according to L1 or L3 measurements by connections 102 or 104 and according to QCLed relationships of interface 112 connection of a serving BS (e.g. BS 111a) and an associated BS (e.g. BS 111b)

The RAN 110 is shown to be communicatively coupled to a core network—in this aspect, CN 120. The CN 120 can comprise a plurality of network components 122, which are configured to offer various data and telecommunication services to customers/subscribers (e.g., users of UEs 101) that are connected to the CN 120 via the RAN 110.

In some aspects, physical downlink shared channel (PDSCH) signaling may carry user data and higher layer signaling to UEs 101. The physical downlink control channel (PDCCH) may carry information about the transport format and resource allocations related to the PDSCH channel, among other things. The PDCCH may also inform UEs 101 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN 110 based on channel quality information fed back from any of UEs 101. The downlink resource assignment information may be sent on the PDCCH used for (e.g., assigned to) each of UEs 101.

Enhanced RRM Measurements

Figure 2:
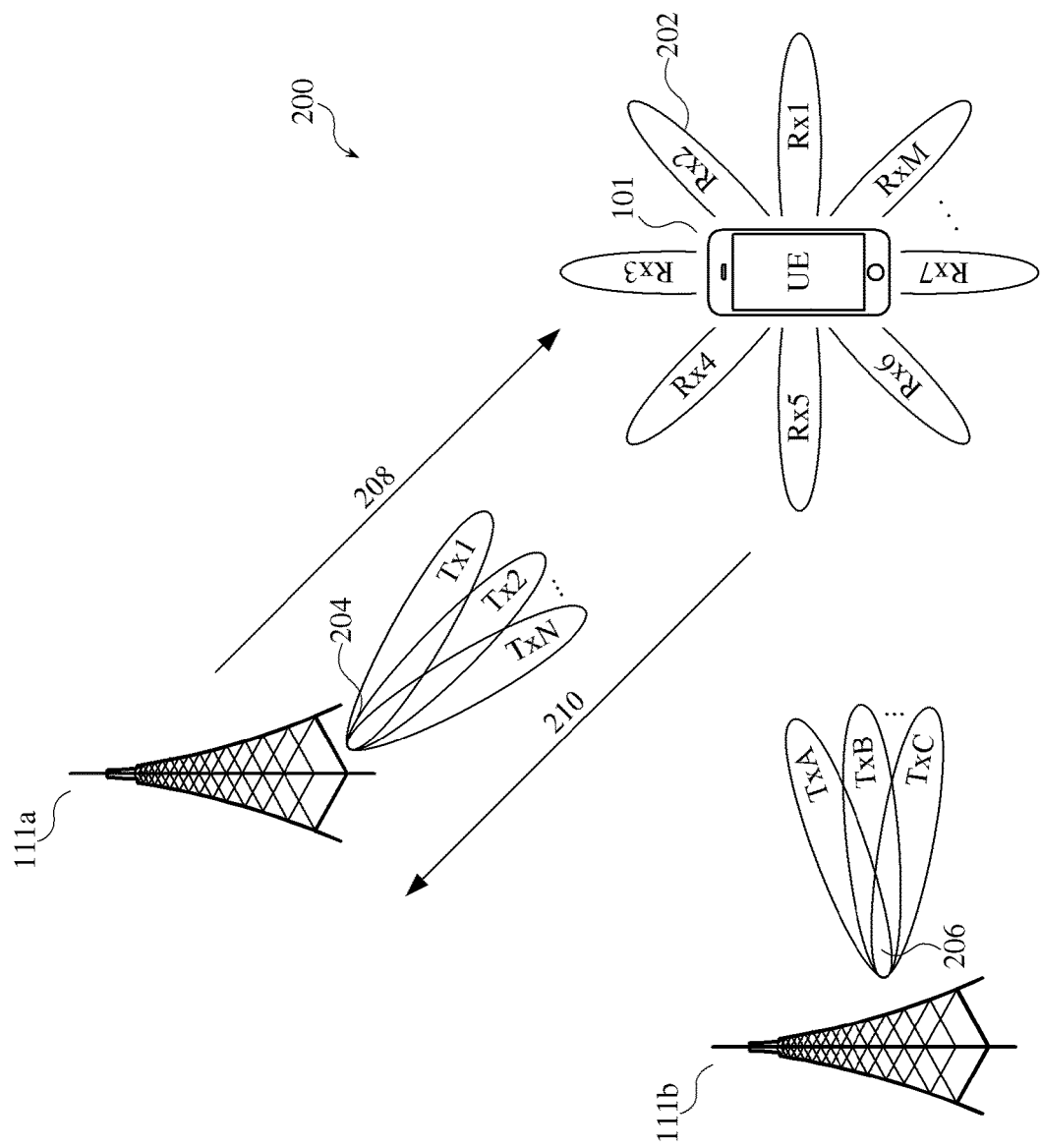
FIG. 2 illustrates beam sweeping paradigm of a network that includes a user equipment (UE), a serving base station (BS), and an associated BS.

FIG. 2 illustrates beam sweeping paradigm 200 of a network that includes a UE 101, a serving BS 111a, and an associated BS 111b.

In the beam sweeping paradigm 200, the UE 101 can be the UE 101a or UE 101b of FIG. 1. The serving BS 111a can be the serving BS 111a of FIG. 1 and can also be referred to as a serving cell. The associated BS 111b can be the BS 111b of FIG. 1 and can also be referred to as an associated serving cell or a neighbor cell or neighbor BS. UE 101 can configure a beam sweeping procedure using receive (Rx) beams 202 where Rx beams 202 are denoted as Rx1 through RxM. It is noted that UE 101 is depicted with Rx beams 202 that include eight total beams, Rx beams 202 are not limited in this respect. In some examples Rx beams 202 comprise less than eight total beams, and in other examples, more than eight total beams. In some examples Rx beams 202 are associated with frequency range 2 (FR2), additionally or alternatively, Rx beams 202 are associated with other frequency ranges, for example, gigahertz (GHz) and terahertz (THz) frequency ranges. FR2 can comprise frequencies in the range of 26 GHz to 71 GHz.

The beam sweeping procedure can be configured on the basis of one or more beam measurement indicators that can include initial downlink beam selection, uplink or downlink beam refinement, beam optimization, beam failure, or the like. Upon determining to configure the beam sweeping procedure, the UE 101 configures sweeping the Rx beams 202 in a plurality of receive directions (e.g. the directions depicted by Rx1, Rx2, through RxM) to detect one or more beams of the serving BS 111*a* or the associated BS 111*b*. For example, serving BS 111*a* may include serving transmit (Tx) beams 204 denoted as Tx1 through TxM and associated BS 111*b* may include associated Tx beams 206 denoted as TxA through TxC. It is noted that serving Tx beams 204 and associated Tx beams 206 can include more or less beams than depicted.

The beam sweeping procedure includes performing measurements on the detected one or more beams. In some aspects, the beam sweeping procedure includes sweeping through Rx beams 202 continuously in a circular or iterative manner to complete beam detection in a spatial coverage supported by the Rx beams 202. Upon completion of the beam sweeping procedure, the UE 101 will determine which of the serving Tx beams 204 and the associated Tx beams 206 are detected, and prioritize the detected beams accordingly for measurement reporting.

The serving BS 111*a* can indicate a measurement link information 208 to the UE 101. The UE 101 can perform the beam sweeping procedure based on the measurement link information 208. The UE 101 can transmit a measurement report 210 with measurement results from the beam sweeping procedure based on the measurement link information 208. The measurement link information 208 can indicate a beam or a transmission configuration indicator (TCI) state associated with a synchronization signal block (SSB) of associated BS 111*b*. The serving BS 111*a* can generate the measurement link information 208 based on a quasi-co-located (QCLed) relationship between the serving BS 111*a* and the associated BS 111*b*. For example, although the associated BS 111*b* can have a physical cell ID (PCI) that is different from a PCI of the serving BS 111*a*, the SSB of the associated BS 111*b* can be regarded as QCL (e.g. QCL-Type D) with a reference signal (RS) of the serving BS 111*a* through a TCI state. As such, the UE 101 configures layer 1 (L1) reference signal received power (RSRP) measurements on one or more of the serving Tx beams 204 or the associated Tx beams 206 during the beam sweeping procedure based on a TCI state linking information indicated by the TCI state. In some aspects, the UE 101 can perform L1 measurements according to an Rx beam for a Tx beam of one of the serving BS 111*a* or associated BS 111*b* and leverage the QCLed relationship between the two BSs to determine an Rx beam for a Tx beam of the other BS. For example, the UE 101 may perform L1 measurements according to Rx beam 1 for a reference signal or SSB transmission that is transmitted using Tx beam 1 of the serving BS 111*a*. The UE 101 may determine, based on a TCI state associated with the reference signal or SSB transmission, that TxC of the associated BS 111*b* is QCLed with Tx beam 1 of the serving BS 111*a*. Based on this QCL determination, the UE 101 may similarly perform L1 measurements using Rx beam 1 for both transmissions using TxC of the associated BS 111*b* and transmissions using Tx beam 1 of the serving BS 111*a*. In other words, the UE 101 would not have to perform a separate beam sweeping procedure to determine an appropriate beam for measuring signals of the associated BS 111*b*, given the QCL relationship between beams of the associated BS 111*b* and the serving BS 111*a*. Similar aspects apply accordingly for layer 3 (L3) measurement procedures. As such, the UE 101 can estimate or derive measurement information of the serving BS 111*a* and associated BS 111*b* in a resource efficient manner. In this aspect, the serving BS 111*a* can indicate the TCI state linking information to the UE 101 through physical downlink share channel (PDSCH) signaling.

In alternative or additional aspects, a measurement configuration, for example, indicated by the measurement link information 208, generated by the serving BS 111*a* can indicate a configuration for the UE 101 to perform layer 3 (L3) measurements. The RRM measurements can include one or more of a reference signal received power (RSRP) measurement, a reference signal received quality (RSRQ) measurement, or a signal to interference plus noise ratio (SINR) measurement. In this aspect, the serving BS 111*a* can indicate the measurement link information 208 to the UE 101 through radio resource control (RRC) signaling. The TCI state linking information can indicate a QCLed relationship between beams or SSBs of the associated BS 111*b* and the RS of the serving BS 111*a*. In some aspects, the SSBs of the associated BS 111*b* are RRC configured to be QCLed with the serving BS 111*a* channel state information (CSI)-RS (CSI-RS), non-zero power-CSI-RS (NZP-CSI-RS), or SSB. In this aspect, ongoing beam tracking by the UE 101 of the serving BS 111*a* RSs can improve the selection of one or more Rx beams 202 for RRM measurements. The UE 101 may be able to fulfill measurement requirements using a subset of Rx beams that correspond to beams or SSBs indicated by the TCI state linking information. In other aspects, the UE 101 may be able to configure beam forming of Rx beams 202 that result in improved tracking of serving Tx beams 204 or associated Tx beams 206, based on the TCI state link information, such as SSBs.

The measurement configuration can further indicate a synchronization signal block (SSB) based measurement timing configuration (SMTC) for the UE 101. The SMTCs can be directly indicated in the measurement configuration or derived by the UE 101 from the measurement configuration, or preconfigured. The SMTC provides periodicity, time offset, and measurement duration information to measure the SSBs of the serving BS 111*a* or associated BS 111*b*. Furthermore, more than one SMTC can be configured per beam for averaging. In some aspects, the UE 101 can determine a number of SMTCs per beam of the Rx beams 202. The UE 101 can determine a subset number of SMTCs, of the number of SMTCs, based on the QCLed relationships indicated by the measurement configuration. In other aspects, the UE 101 can determine an increased number of SMTCs relative to the number of SMTCs, based on the QCLed relationship indicated in the measurement link information 208.

As such, the UE 101 can conserve resources by reducing a total number of measurements, reduce measurement reporting time, or increase measurement accuracy by using a subset of Rx beams or the subset of SMTCs, instead of the full set of Rx beams or SMTCs. The serving BS 111a can increase network (e.g. RAN 110, CN 120 of FIG. 1) throughput by configuring the subset of Rx beams 202 or the subset of SMTCs. Further aspects of network optimization according to the beam sweeping procedure for UE 101 are described herein.

Figure 3:
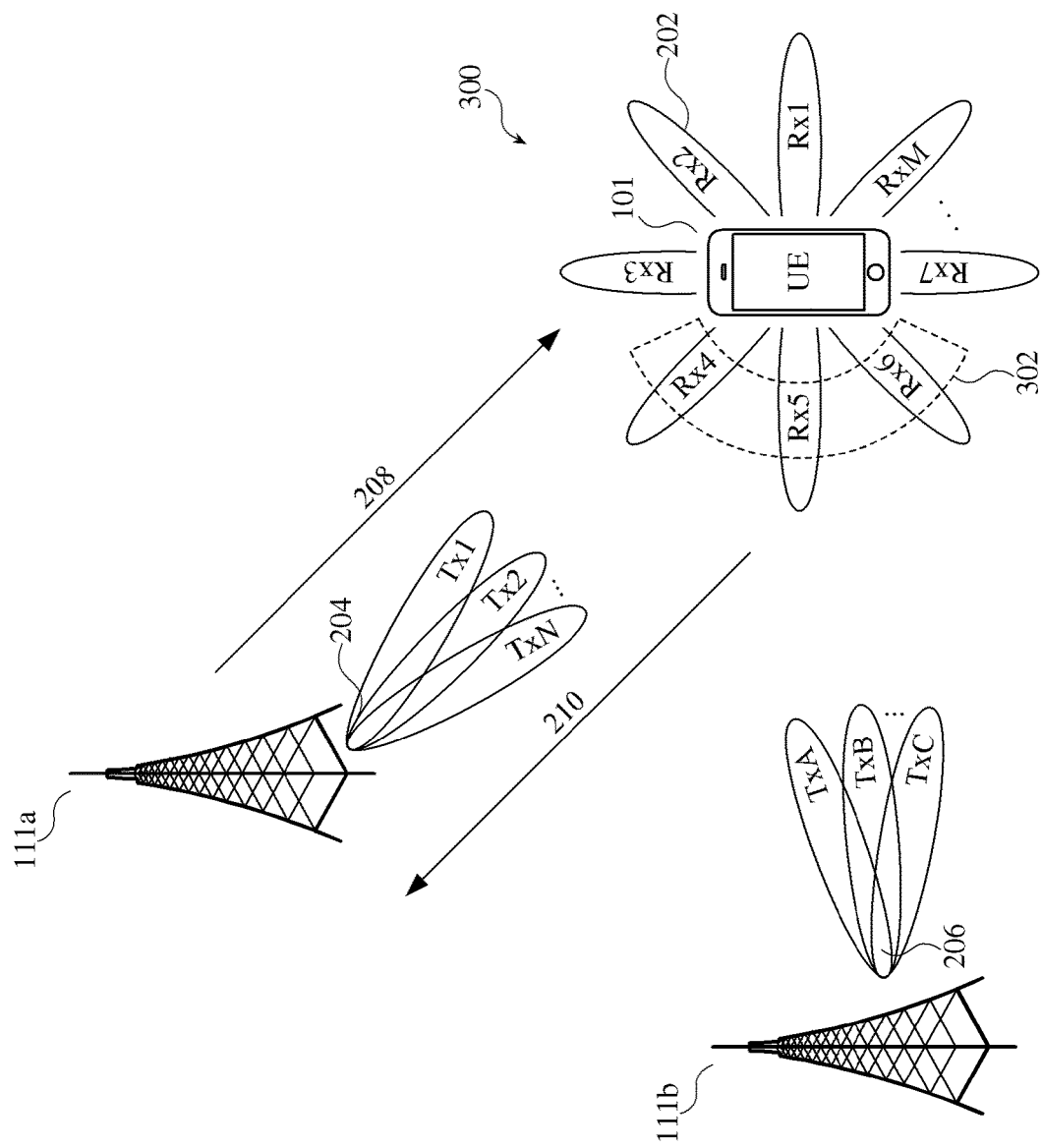
FIG. 3 illustrates a diagram of enhanced radio resource management (RRM) measurements based on a subset number of receive (Rx) beams based on transmission configuration indicator (TCI) state link information.

FIG. 3 illustrates a diagram 300 of enhanced RRM measurements based on a subset number of Rx beams based on TCI state link information. FIG. 3 corresponds to aspects of FIG. 2 where FIG. 3 additionally depicts a subset number of Rx beams 302. As such, the UE 101 can autonomously reduce the number of Rx beams swept and or a number of SMTCs measured per Rx beam while the network maintains an expected timing requirement thereby reducing the power consumption of the UE or increasing the measurement quality of measured serving Tx beams 204 or associated Tx beams 206.

The UE 101 receives the measurement link information 208 from the serving BS 111a. The UE 101 determines a number of Rx beams (N) from the measurement link information 208 that the UE 101 can use for the beam sweep procedure or RRM measurements. For example, the measurement link information 208 can include a TCI state link information that directly comprises the number of Rx beams that the UE 101 uses for measurements, or the UE 101 can derive the number of Rx beams from the TCI state link information. In some aspects, the number of Rx beams is preconfigured. In similar or alternative aspects, the number of Rx beams is the number of Rx beams 202 that the UE 101 can use for beam sweeping. In similar or alternative aspects, the number of Rx beams is equal to eight (e.g. N=8).

The UE 101 can also determine a number of SMTCs (Y) per Rx beam of the number of Rx beams from the measurement link information 208. As such, the number of SMTCs per Rx beam can be used for measurement averaging to increase the quality of RRM measurements. Thus, the UE 101 can perform multiple measurements of serving Tx beams 204 or associated Tx beams 206 per Rx beam of the UE 101 based on the number of SMTCs per Rx beam. The measurement configuration can directly comprise the number of SMTCs, or the UE 101 can derive the number of SMTCs from the measurement configuration. In some aspects, the number of SMTCs are preconfigured. In similar or alternative aspects, the number of SMTCs are use-case specific, for example, are specific to intra-frequency or inter-frequency measurements. As such, the UE 101 can determine a total number of SMTCs equal to the product of N and Y.

In accordance with configuring the number of Rx beams, and the number of SMTCs, the UE 101 may autonomously determine that the beam sweeping procedure can be performed with RRM measurements according to a subset number of Rx beams ($N_{UE}$). The UE 101 can determine $N_{UE}$ based on the QCLed relationships of resources associated with the serving BS 111a and associated BS 111b indicated by the TCI state link information. In this aspect, the UE 101 determines that $N_{UE}$ is sufficient for RRM measurements and that measurement criteria will be met according to $N_{UE}$ rather than N. For example, the number of Rx beams can be Rx beams 202, and the subset number of Rx beams can be the beams indicated by 302, which in FIG. 3 are Rx beams Rx4-Rx6. It is noted that this example is not limiting, the subset number of Rx beams 302 can be any number of Rx beams 202 that is less than the total number of Rx beams 202 denoted by Rx1 through RxM. As such, the UE 101 can reduce the number of Rx beams used for RRM measurements thus reducing the power consumption and resources of the UE 101

Additionally, or alternatively, the UE 101 can autonomously determine that an increased number of SMTCs ($Y_{UE}$). In this aspect, the UE 101 increases the number of SMTCs per Rx beam of the subset number of Rx beams thus increasing the averaging of measured beams and improving measurement quality.

FIG. 4 illustrates a table 400 of Rx beams and SMTCs for UE 101 RRM measurements associated with FIG. 3.

Table 400 further describes the beams and SMTCs of FIG. 3. The top row indicates the number of Rx beams (N), which in this example, is depicted as Rx1-RxM. The number of SMTCs 402 (Y) are depicted as SMTC1 through SMTCG per Rx beam of N. As discussed previously, the subset number of Rx beams 302 ($N_{UE}$) is depicted as Rx4 through Rx6, or any number of Rx beams 202 less than a total number of Rx beams 202. The increased number of SMTCs 404 ($Y_{UE}$) are depicted by the shaded SMTC occasions from SMTC1 through SMTCi per beam of $N_{UE}$ 302.

The UE 101 can conserve battery power and resources by performing RRM measurements of the beam sweeping procedure according to $N_{UE}$ relative to N. For example, an indicated number of SMTC occasions, which relates to a number of measurements performed by the UE 101, can be denoted by X as the product of N and Y. When the UE 101 determines, based on QCLed resource relationships indicated by the TCI state link information, that measurement criteria can be met based on $N_{UE}$. Then a total number of SMTCs can be denoted by $X_{UE}$ as the product of $N_{UE}$ and Y. In a non-limiting example, N can be 8 (e.g. 8 configured Rx beams), and Y can be 5 (e.g. 5 SMTCs per N configured Rx beams). The indicated number of SMTC occasions (X) by serving BS 111a is 40. Thus, the UE 101 would perform RRM measurements according to the 40 SMTC measurement occasions. However, the UE 101 can generate $N_{UE}$ to be 3 (e.g. Rx4-Rx6, 3 configured Rx beams). The UE 101 would generate $N_{UE}$ based on L3 SSBs of the associated BS 111b QCLed with the RS of the serving BS 111a. Thus $X_{UE}$ is the product of $N_{UE}$ and Y which is 15 SMTC measurement occasions, and $X_{UE}$ is less than X. The UE 101 is able to meet measurement requirements with a reduced number of Rx beams 202 thus saving UE 101 resources.

Alternatively, the UE 101 can autonomously increase measurement quality with the same or less SMTC measurement occasions as indicated by X. UE 101 can increase measurement quality in this aspect by reducing $N_{UE}$ relative to N and increasing $Y_{UE}$ (e.g. increased number of SMTCs 404) relative to Y, where $X_{UE}$ is the product of $N_{UE}$ and $Y_{UE}$ and where $X_{UE}$ is less than or equal to X. In a non-limiting example, X can be the product of N and Y, similar to the previous example, N can be 8, and Y can be 5, and X is 40. The UE 101 can configure $N_{UE}$ to 3 and can increase $Y_{UE}$ to 7, thus $X_{UE}$ is the product of $N_{UE}$ and $Y_{UE}$ which is 21. In this aspect, $X_{UE}$ is less than X, and the number of SMTC occasions per Rx beam is increased (e.g. $Y_{UE}$ is more than Y). The UE 101 is able to autonomously perform higher quality measurements relative to X with less measurement occasions. Alternatively, the UE 101 can configure $N_{UE}$ to 4, and $Y_{UE}$ to 10, where $X_{UE}$ is the product of $N_{UE}$ and $Y_{UE}$ which is 40. In this aspect, $X_{UE}$ is equal to X and the number of SMTC occasions per Rx beam is increased (e.g. $Y_{UE}$ is more than Y).

In the above examples, the UE 101 de-configures performing RRM measurements on Rx beams 202 that are sub-optimal for the RRM measurements based on the TCI state link information. Or said alternatively, the UE 101 performs RRM measurements according to $N_{UE}$ corresponding to QCLed resources based on the TCI state link information in an optimal manner. For example, in some aspects, the UE 101 may determine that some Rx beams are overheating, blocked, or are oriented in a disadvantageous spatial direction for measuring SSBs indicated by the TCI state link information. If the UE 101 performed RRM measurements on said beams, the UE 101 may waste measurement resources on certain Rx beams 202. In one example, UE 101 can determine a spatial relationship between the subset number of Rx beams 302 and serving Tx beams 204 or associated Tx beams 206, and thus un-configure Rx beams (e.g. Rx1-Rx3, Rx7, and RxM) as they do not share a spatial relationship with resources indicated by the TCI state link information. Alternatively, or additionally, the UE 101 may determine that $N_{UE}$ could include the subset number of Rx beams 302 (E.g. Rx4 through Rx6) and Rx3. However, the UE 101 may determine that beam Rx3 is blocked or overheated, and autonomously configure $N_{UE}$ to include Rx4 through Rx6 and not include Rx3, even though Rx3 may have a spatial relationship with the Tx beams. UE 101 is able to determine $N_{UE}$ and $Y_{UE}$ autonomously, and without signaling between the UE 101 and serving BS 111a, thereby reducing signaling overhead with the network. Thus the serving BS 111a can assume static measurement timing requirements.

Figure 5:
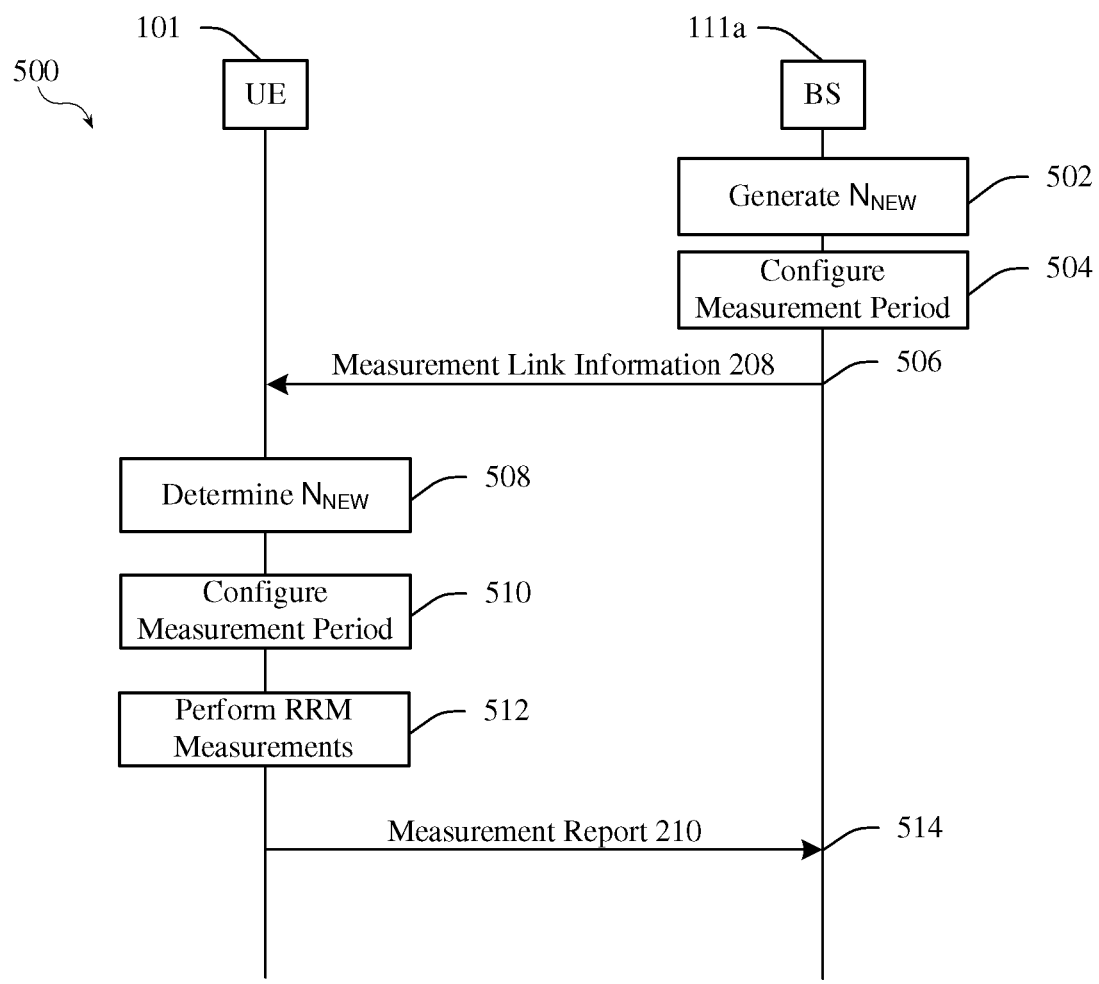
FIG. 5 is a signal flow diagram depicting example signaling for enhanced radio resource management (RRM) measurements according to a measurement period based on quasi-co-located (QCLed) resources of serving base station (BS) and associated BS.

FIG. 5 is a signal flow diagram 500 depicting example signaling for enhanced RRM measurements according to a measurement period based on QCLed resources of serving BS 111a and associated BS 111b. In this example, the serving BS 111a can indicate a subset number of Rx beams ($N_{NEW}$) relative to an available number of Rx beams (N), and the serving BS 111a and UE 101 can determine a measurement period or measurement duration based on the subset number of Rx beams to achieve faster measurement reporting or network throughput.

In the signal flow diagram 500, the serving BS 111a generates a subset number of Rx beams ($N_{NEW}$) at 502. $N_{NEW}$ can be a subset of a predefined number of Rx beams (N) or a subset of a total number of available Rx beams (N), for example, Rx beams 202 of FIGS. 2-3. The serving BS 111a generates $N_{NEW}$ according to measurement link information 208 to reduce the number of Rx beams 202 used for RRM measurements by the UE 101. In some aspects, the measurement link information 208 comprises TCI state linking information corresponding to L3 SSBs of the associated BS 111b that are QCLed with the RS of the serving BS 111a. The TCI state linking information indicates a number of TCI states associated with QCLed relationships between the serving BS 111a and the associated BS 111b. In some aspects, $N_{NEW}$ can be based on the number of TCI states, for example, the number of TCI states associated with neighbor cells on a frequency layer.

The serving BS 111a can configure a measurement period at 504 for SMTC occasions associated with $N_{NEW}$. The measurement period can be configured to achieve fast measurement reporting, or increased network throughput considering $N_{NEW}$ relative to N. The measurement period can relate to a measurement period for QCLed SSBs as indicated by the measurement link information 208, for intra-frequency measurements, inter-frequency measurements, or the like.

In a first example, the serving BS 111a configures the measurement period for fast measurement reporting. In additional or alternative aspects, the UE 101 can determine the measurement period, for example, at 508. In this aspect, the total possible SMTCs (X) is based on a product of the total number of Rx beams 202 (N) and a number of SMTCs (Y), where Y is pre-configured or use-case specific as described previously. The serving BS 111a can configure $N_{NEW}$ based on N according to the QCLed SSBs of the measurement link information 208. The serving BS 111a, or the UE 101, determines a new number of SMTCs ($X_{NEW}$) based on a product of $N_{NEW}$ and Y, and the measurement period is based a product of $X_{NEW}$ and a SMTC periodicity (T). As such, a measurement period based on the total possible SMTCs (X) is a product of N, Y, and T. A measurement period based on the new number of SMTCs ($X_{NEW}$) is a product of $N_{NEW}$, Y, and T, where the measurement period based on $X_{NEW}$ is less than the measurement period based on X.

In a non-limiting example, N is 8 (e.g. 8 Rx beams), Y is 3 (e.g. 3 SMTCs per Rx beam), and T is 40 milliseconds (ms), and the measurement period is 960 ms. The serving BS 111a, or UE 101, can determine that, based on the QCLed relationships of the determined measurement link information 208, $N_{NEW}$ can be 4 (e.g. 4 Rx beams that correspond to QCLed Tx SSBs). Thus the measurement period is based on the product of $N_{NEW}$, Y, and T, is 480 ms. The measurement period based on $N_{NEW}$ is less than the measurement period based on N, and the UE 101 can perform RRM measurements faster according to $N_{NEW}$.

In a second example, the serving BS 111a configures the measurement period for increased system throughput. In this example, the measurement period is configured based on N and the SMTC periodicity (T) is increased based on a SMTC periodicity scalar (S), to define a new SMTC periodicity ($T_{NEW}$). S is a function of the number of Rx beams (N) divided by the subset number of Rx beams ($N_{NEW}$). The new SMTC periodicity ($T_{NEW}$) is a product of T and S. The measurement period is configured based on a product of N, Y, and T. The new number of SMTCs ($X_{NEW}$) is defined as a product of $N_{NEW}$ and Y, and $X_{NEW}$ is mapped to $N_{NEW}$ according to S. As the SMTC occasions are conducted according to the increased SMTC periodicity over the measurement period, the throughput of the network can be improved as there is a longer period of time in which the UE 101 isn't performing RRM measurements, thereby freeing periods for other transmissions. Throughput is increased since there are less measurement durations (e.g. 5 ms or less) scheduled over $T_{NEW}$. As such, less measurement durations are scheduled to take place during an increased measurement opportunity defined by $T_{NEW}$.

The following is a non-limiting example of applying $T_{NEW}$. N is 8 (e.g. 8 Rx beams), Y is 3 (e.g. 3 SMTCs per Rx beam), and T is 40 ms. X is the product of N and Y which is 24. The measurement period is the product of N, Y, and T which is 960 ms, or in other words, 24 total SMTC occasions that would occur in 40 ms SMTC periodicities totaling a measurement period of 960 ms. As such, if the measurement duration is 5 ms per 40 ms SMTC periodicities, the total time measurements take place is the product of the measurement duration and X which is 120 ms of measurements distributed over the 960 ms measurement period. However, the UE 101 will measure $N_{NEW}$ equal to 4 Rx beams rather than N equal to 8 Rx beams. Thus, $N_{NEW}$ is 4 (e.g. 4 Rx beams that correspond to QCLed Tx SSBs), and $X_{NEW}$ is a product of $N_{NEW}$ and Y, which is 12 total SMTC occasions. S is N divided by $N_{NEW}$ which is 2, and thus $T_{NEW}$ is the product of T and S which is 80 ms. As such, 12 total SMTC occasions occur in 80 ms SMTC periodicities totaling a measurement period of 960 ms that map to $N_{NEW}$ of 4 Rx beams. As such, if the measurement duration is 5 ms per 80 ms SMTC periodicities, the total time measurements take place is the product of the measurement duration and $X_{NEW}$ which is 60 ms of measurements distributed over the 960 ms measurement period. Thus less time is devoted to measurements according to $X_{NEW}$ compared to X over the same measurement period, thus freeing up resources for increased throughput. As such, $N_{NEW}$ beams are configured to be measured over the measurement period defined by N thereby enabling higher system throughput compared to N beams configured to be measured over the measurement period defined by N.

At 506 the serving BS 111a transmits the measurement link information 208 to the UE 101. At 508 the UE 101 determines one or more of N, $N_{NEW}$, Y, T, S, or $T_{NEW}$. The UE 101 can determine the above quantities directly from the measurement configuration, or the UE 101 can determine the above quantities by derivation based on the QCLed relationships indicated by the measurement link information 208. In some aspects, the UE 101 equates $N_{NEW}$ and $N_{UE}$.

At 510 the UE 101 configures the measurement period according to aspects described above at 504. As such, the UE 101 can generate a measurement period analogous to the measurement period at 504, based on the measurement configuration or measurement link information 208, for example, based on the number of Rx beams (N). In some aspects, the UE 101 generates a subset number of Rx beams (referred to as $N_{UE}$ or $N_{NEW}$) of the number of Rx beams, and the measurement period is based on the subset number of Rx beams. In other aspects, the UE 101 determines or generates a SMTC periodicity scalar (S) based on the number of Rx beams divided by the subset number of Rx beams. The UE 101 can generate a new SMTC periodicity ($T_{NEW}$) of the SMTCs based on the SMTC periodicity scalar (S). The above description is non-limiting with regards to configuring the measurement period and the SMTC periodicity scalar. The UE 101 can configure the measurement period and SMTC periodicity scalar according to the aspects described in greater detail in 504 with regards to the serving BS 111a.

At 512 the UE 101 performs RRM measurements according to the measurement period and the L3 SSBs QCLed with the RS. In this aspect, the RRM measurements are performed on Rx beams of the subset number of Rx beams. In some aspects, the RRM measurements are performed according to a mapping of the subset number of Rx beams and the SMTC periodicity of the SMTCs.

At 514, the UE 101 can transmit a measurement report 210 to the serving BS 111a where the measurement report 210 is based on the RRM measurements.

Figure 6:
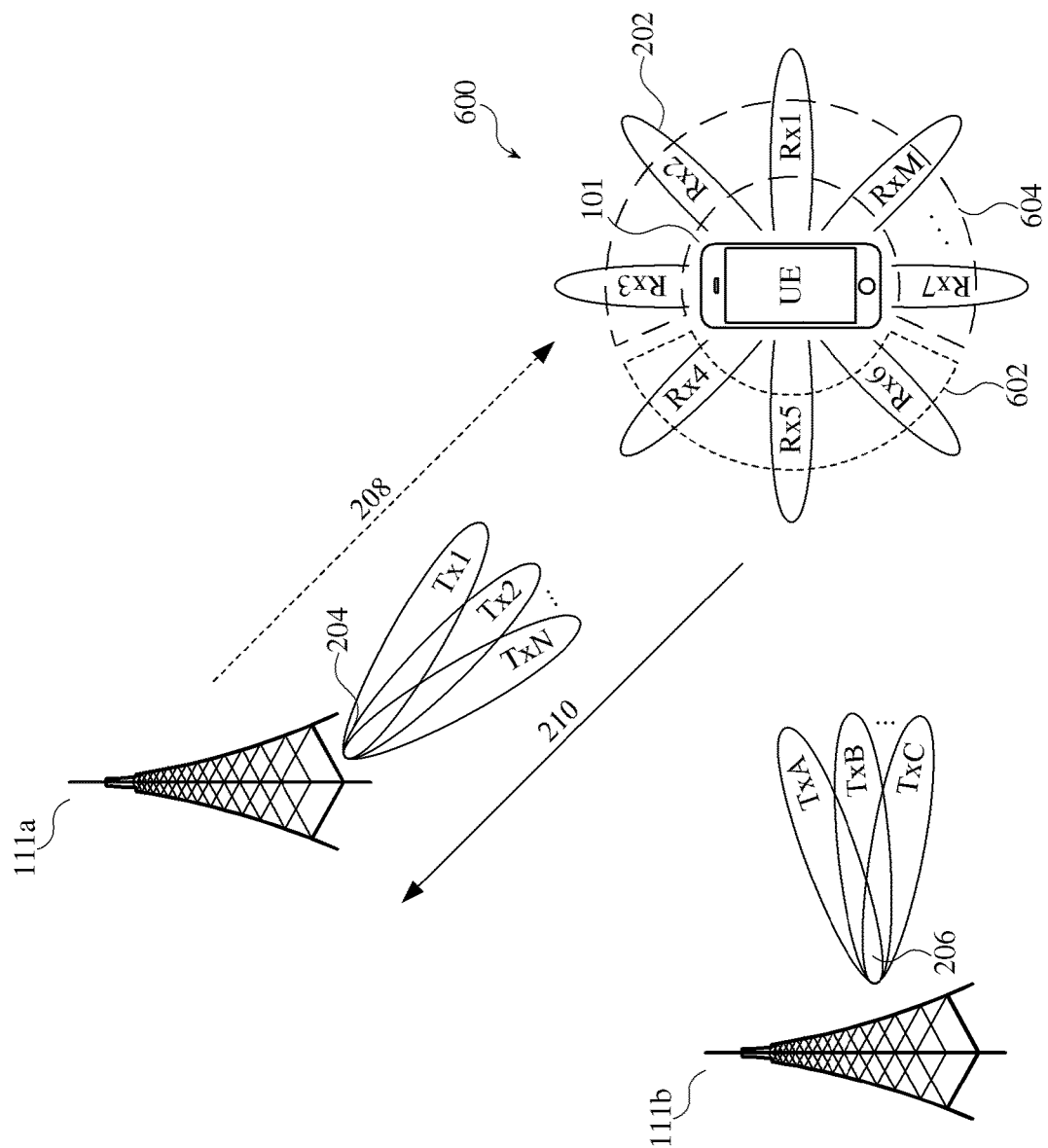
FIG. 6 illustrates a diagram of enhanced radio resource management (RRM) measurements based on Rx beam prioritization.

FIG. 6 illustrates a diagram 600 of enhanced radio resource management (RRM) measurements based on Rx beam prioritization. FIG. 6 corresponds to some aspects of FIGS. 2 and 3, where FIG. 6 shows high priority and low priority Rx beams. As such, the UE 101 can perform RRM measurements according to a number of Rx beams and prioritize the number of Rx beams based on a performance evaluation procedure.

In diagram 600, the UE 101 performs RRM measurements according to Rx beams of the UE 101. The UE 101 may or may not receive the measurement link information 208 from the serving BS 111a. In one aspect, the UE 101 receives the measurement link information 208 and determines that all of the Rx beams of the UE 101 should be configured for RRM measurements. In another aspect, the UE 101 does not receive the measurement link information 208 and determines to configure all of the Rx beams of the UE 101 for RRM measurements. As such, the UE 101 determines that the number of Rx beams (N) are all of the Rx beams 202 of the UE 101. Furthermore, the UE 101 determines the number of SMTCs (Y) per Rx beam of the number of Rx beams according to aspects previously described, for example, Y is use-case specific. As discussed previously, the indicated total number of SMTC occasions (X) is the product of N and Y.

To better utilize measurement resources, the UE 101 can prioritize RRM measurements according to a performance evaluation procedure. The performance evaluation procedure can include evaluation criteria including evaluating UE 101 antenna ports, UE 101 antenna panels, a spatial orientation of Rx beams, a reflection coefficient of the Rx beams, a temperature of antenna ports or antenna panels, antenna blockage, a motion of the UE, or the like. The UE 101 can prioritize the Rx beams 202 according to the evaluation criteria. The UE 101 can generate a number of high priority Rx beams ($N_{UEHigh}$) where $N_{UEHigh}$ is a subset of Rx beams 202, and determined to be beams that satisfy one or more of the evaluation criteria during the performance evaluation procedure. The UE 101 can generate a number of low priority Rx beams ($N_{UELow}$) where $N_{UELow}$ is a subset of Rx beams 202, and determined to be beams that may not satisfy one or more of the evaluation criteria during the performance evaluation procedure. It is noted that the sum of $N_{UEHigh}$ and $N_{UELow}$ is equal to N and the Rx beams of $N_{UEHigh}$ are different than Rx beams of $N_{UELow}$.

$N_{UEHigh}$ is depicted as high priority beams 602 and $N_{UELow}$ is depicted as low priority beams 604. For example, high priority beams 602 can be beams Rx4 through Rx6 and low priority beams 604 can be Rx1, Rx2, Rx7, and RxM. The high priority beams 602 and low priority beams 604 are not limited in this respect and can include a different allocation of Rx beams 202. In this respect, the UE 101 autonomously prioritizes $N_{UEHigh}$ and $N_{UELow}$. Furthermore, the UE 101 can autonomously configure SMTCs for $N_{UEHigh}$ and $N_{UELow}$ as discussed in further detail herein.

Figure 7:
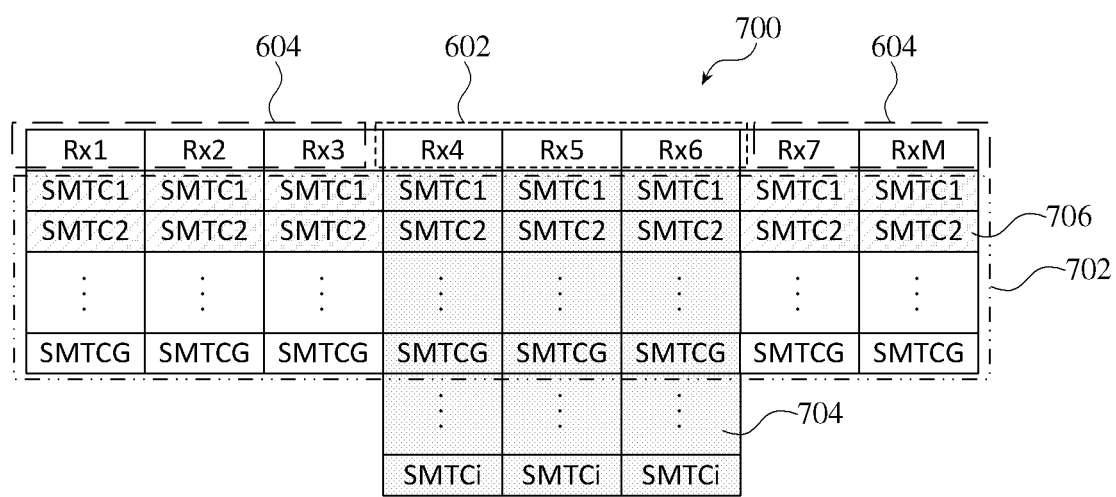
FIG. 7 illustrates a table of prioritized Rx beams and synchronization signal block (SSB) based measurement timing configuration (SMTC) for user equipment (UE) radio resource management (RRM) measurements associated with FIG. 6.

FIG. 7 illustrates a table 700 of prioritized Rx beams and SMTCs for UE 101 RRM measurements associated with FIG. 6.

Table 700 further describes the Rx beam and SMTC prioritization of FIG. 6. The top row of table 700 indicates the number of Rx beams (N) which are divided into $N_{UEHigh}$ indicated by high priority beams 602, and $N_{UELow}$ indicated by low priority beams 604. The number of SMTCs (Y) are denoted as SMTCs 702 that include SMTC1 through SMTCG per Rx beam. The UE 101 can autonomously prioritize SMTCs that correspond to $N_{UEHigh}$ and $N_{UELow}$. UE 101 can configure an increased number of SMTCs ($Y_{UEHigh}$) of SMTCs 702 that correspond to $N_{UEHigh}$. The increased number of SMTCs can be referred to as high priority SMTCs. In this aspect, the increased number of SMTCs are denoted by 704, SMTC1 through SMTCi, where $Y_{UEHigh}$ is greater than Y. The UE 101 can configure a decreased number of SMTCs ($Y_{UELow}$) of SMTCs 702 that correspond to $N_{UELow}$. The decreased number of SMTCs can be referred to as low priority SMTCs. In this aspect, the decreased number of SMTCs are denoted by 706, SMTC1 through SMTC2, where $Y_{UELow}$ is less than Y. As such, $Y_{UELow}$ is a subset of Y. The depiction of $Y_{UEHigh}$ and $Y_{UELow}$ are non-limiting, where $Y_{UEHigh}$ and $Y_{UELow}$ can include a different number of SMTCs than that depicted. The generated total number of SMTCs ($X_{UE}$) are based on a product of $N_{UEHigh}$ and $Y_{UEHigh}$ plus a product of $N_{UELow}$ and $Y_{UELow}$ and $X_{UE}$ can be equal to X. The UE 101 autonomously priorities beam and SMTC resources based on evaluation criteria that results in measuring high priority beams 602 more frequently while reducing the frequency with which the low priority beams 604 are measured resulting in higher fidelity RRM measurements. The UE 101 performs RRM measurements during a beam sweeping procedure according to $N_{UEHigh}$, $N_{UELow}$, $Y_{UEHigh}$, and $Y_{UELow}$.

In a non-limiting example, N is 8 (e.g. 8 Rx beams) and Y is 5 (e.g. 5 SMTCs per Rx beam) and X is a product of N and Y which is 40. The UE 101 can perform the performance evaluation procedure and determine $N_{UEHigh}$ is 3 (e.g. high priority beams 602, Rx4 through Rx6), and $N_{UELow}$ is 5 (e.g. low priority beams 604, Rx1, Rx2, Rx3, Rx7, and RxM). The UE 101 can also determine to prioritize SMTCs where $Y_{UEHigh}$ is 10 (e.g. 704 denoted by SMTC1 through SMTCi) corresponding to $N_{UEHigh}$ and $Y_{UELow}$ is 2 (e.g. 706 denoted by SMTC1 through SMTC2) corresponding to $N_{UELow}$. $X_{UE}$ is the product of $N_{UEHigh}$ and $Y_{UEHigh}$ plus the product of $N_{UELow}$ and $Y_{UELow}$ which is 40, and $X_{UE}$ is equal to X. As such, the UE 101 is able to measure high priority beams 602 more frequently than low priority beams 604 without increasing the total number of measurement instances. In the above non-limiting example, the high priority beams 602 are measured five times as often as the low priority beams 604 and the high priority beams 602 are measured twice as often compared to Y.

In a related example, the UE 101 can perform the performance evaluation procedure and determine that a performance requirement for beam sweeping can be satisfied with $X_{UE}$ less than X. As such, the UE 101 can configure $N_{UEHigh}$ and $N_{UELow}$ where the sum of $N_{UEHigh}$ and $N_{UELow}$ is equal to N and the sum of $Y_{UEHigh}$ and $Y_{UELow}$ is less than Y. As such, the UE 101 configures $Y_{UEHigh}$ greater than $Y_{UELow}$ to achieve more frequent measurements from the high priority beams 602 while saving resources by reducing the number of SMTC occasions.

In another example, the UE 101 performs the performance evaluation procedure to include a power analysis and determines that some Rx beams are low priority based on the power analysis. The UE 101 can configure less SMTC occasions (e.g. $X_{UE}$ less than X) to achieve power savings.

Figure 8:
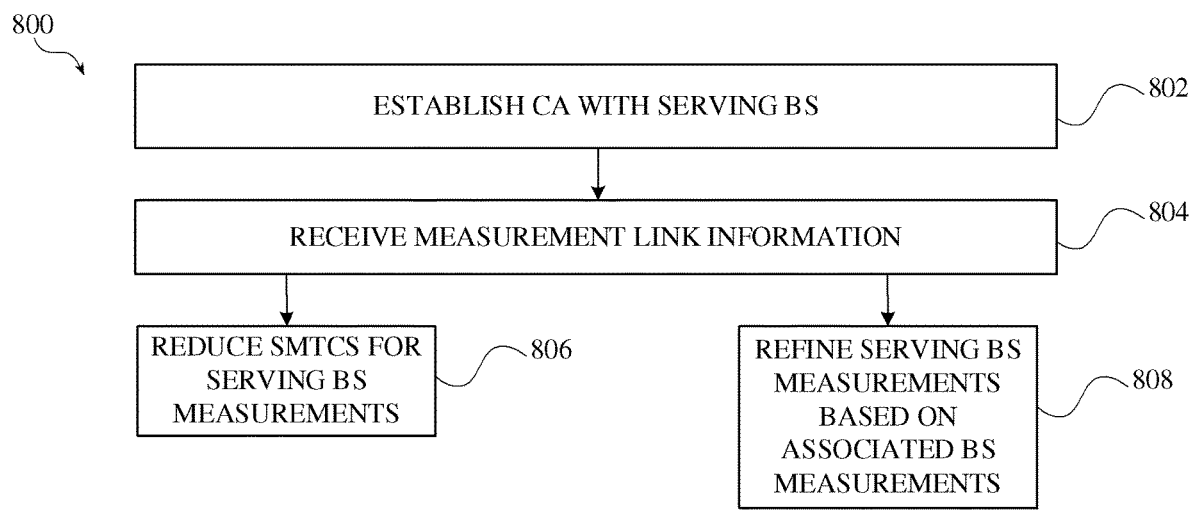
FIG. 8 illustrates a flow diagram of an example method for autonomous layer 1 user equipment (UE) receive (Rx) beam configuration for beam measurement optimization.

FIG. 8 illustrates a flow diagram of an example method 800 for autonomous layer 1 UE 101 Rx beam configuration for beam measurement optimization.

As describes in FIG. 2, the UE 101 can be configured L1 RSRP measurements based on the measurement configuration, where SSBs of the associated BS 111*b* can be QCLed with RS of the serving BS 111*a* as indicated by the measurement link information 208. The UE 101 can use the L1 RSRP measurements of an associated BS 111*b* to aid serving BS 111*a* L1 RSRP measurement. At 802 the UE 101 establishes carrier aggregation (CA) with the serving BS 111*a*, where component carriers (CC) of the serving BS 111*a* are QCLed with the associated BS 111*b*. At 804, the UE 101 receives measurement link information 208 from the serving BS 111*a* indicating to the UE 101 QCLed relationships between the serving BS 111*a* and the associated BS 111*b*, for example, QCLed relationships according to the CC of the serving BS 111*a*.

At 806 the UE 101 can conserve power and reduce measurement delays by reducing the number of beam measurement sweeps on Rx beams measuring the serving BS 111*a*. In this example, the UE 101 leverages the L1 RSRP measurements of Tx beams of the associated BS 111*b* that are QCLed with CCs of Tx beams of the serving BS 111*a* as indicated by the measurement link information 208. By using the L1 RSRP measurements of the associated BS 111*b*, the UE 101 can achieve acceptable measurements on the serving BS 111*a* with less beam sweeps. As such, the UE 101 can autonomously reduce the number of beam sweeps per Rx beam associated with the serving BS 111*a*.

At 808, the UE 101 can improve measurement accuracy of the serving BS 111*a*. In this example, the UE 101 uses L1 RSRP measurements of the associated BS 11*b* to determine beam refinement on Rx beams associated with the serving BS 111*a* through the QCLed CCs. As such, the UE 101 can improve beam sweeping L1 measurements on Tx beams of the serving BS 111*a*. In some aspects, beam refinement is achieved by beamforming of the Rx beams associated with the serving BS 111*a*. Thus, without increasing beam sweeping procedures, the UE 101 can achieve beam refinement on the serving BS 111*a* by leveraging the L1 RSRP measurements of the associated BS 111*b* resulting in improved measurement accuracy.

Figure 9:
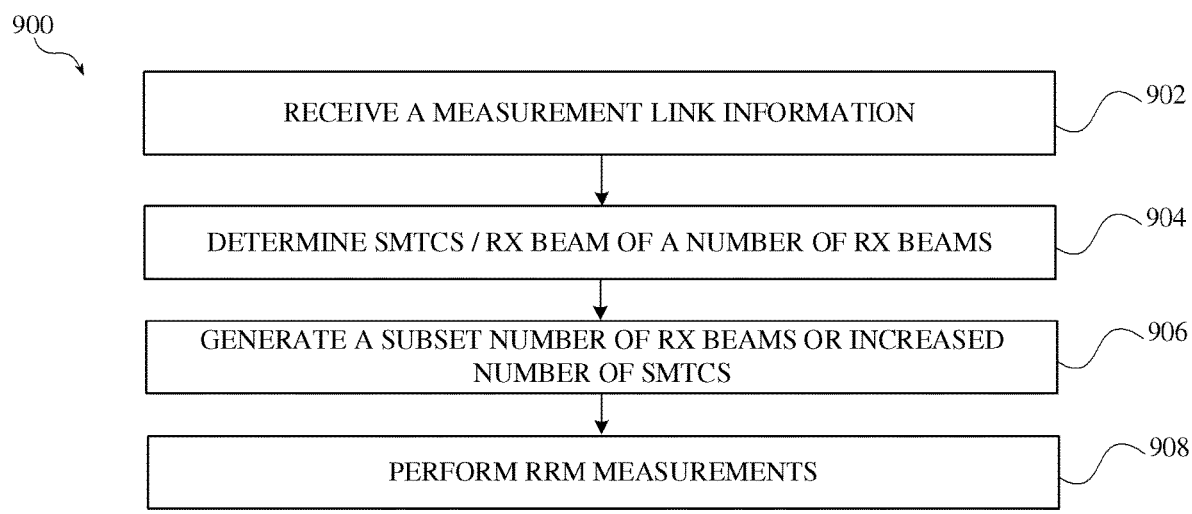
FIG. 9 illustrates a flow diagram of an example method for enhanced radio resource management (RRM) measurements based on a subset number of Rx beams based on a measurement link information.

FIG. 9 illustrates a flow diagram of an example method 900 for enhanced RRM measurements based on a subset number of Rx beams based on a measurement link information. The example method 900 may be performed, for example, by the UE 101 of FIG. 3.

At 902, the method includes receiving a measurement link information that includes QCLed beam information between a serving BS and an associated BS. FIG. 3 at 208 corresponds to some aspects of act 902.

At 904, the method includes determining, from the measurement link information, a number of SMTCs per Rx beam of a number of Rx beams. The number of SMTCs 402 of FIG. 4 corresponds to some aspects of act 904.

At 906, the method includes generating at least one of a subset number of Rx beams of the number of Rx beams based on the measurement link information, or an increased number of SMTCs of the number of SMTCs corresponding to the number of Rx beams. The subset number of Rx beams 302 of FIGS. 3-4, and the increased number of SMTCs 404 of FIG. 4 corresponds to some aspects of act 906.

At 908, the method includes performing RRM measurements according to one or more of the subset number of Rx beams or the increased number of SMTCs. FIGS. 3 and 4 corresponds to some aspects of act 908.

Figure 10:
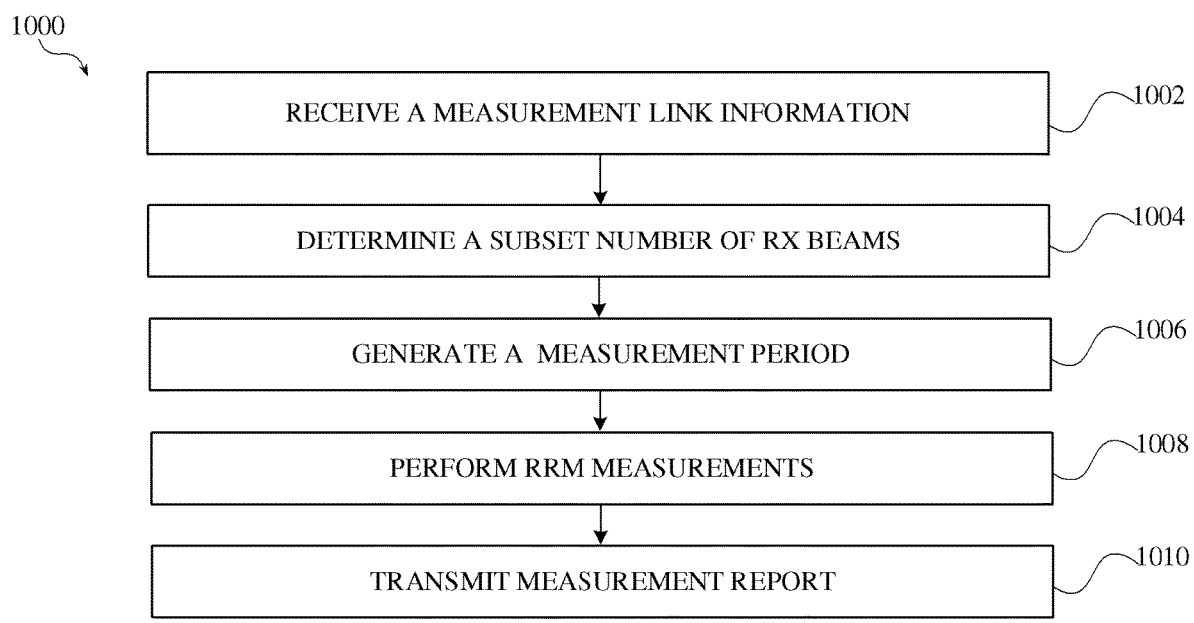
FIG. 10 illustrates a flow diagram of an example method for enhanced radio resource management (RRM) measurements according to a measurement period based on quasi-co-located (QCLed) resources of a serving base station (BS) and associated BS.

FIG. 10 illustrates a flow diagram of an example method 1000 for enhanced RRM measurements according to a measurement period based on QCLed resources of a serving BS and associated BS. The example method 1000 may be performed, for example, by the UE 101 of FIG. 5.

At 1002, the method includes receiving a measurement configuration or measurement link information that indicates L3 SSBs of a neighboring BS that are QCLed with a RS of a serving BS. FIG. 5 at 506 corresponds to some aspects of act 1002.

At 1004, the method includes determining, from the measurement link information, a number of Rx beams. FIG. 5 at 508 corresponds to some aspects of act 1004.

At 1006, the method includes generating and configuring a measurement period based on the number of Rx beams. FIG. 5 at 510 corresponds to some aspects of act 1006.

At 1008, the method includes performing RRM measurements according to the measurement period and the L3 SSBs QCLed with the RS. FIG. 5 at 512 corresponds to some aspects of act 1008.

At 1010, the method includes transmitting a measurement report based on the RRM measurements. FIG. 5 at 514 corresponds to some aspects of act 1010.

Figure 11:
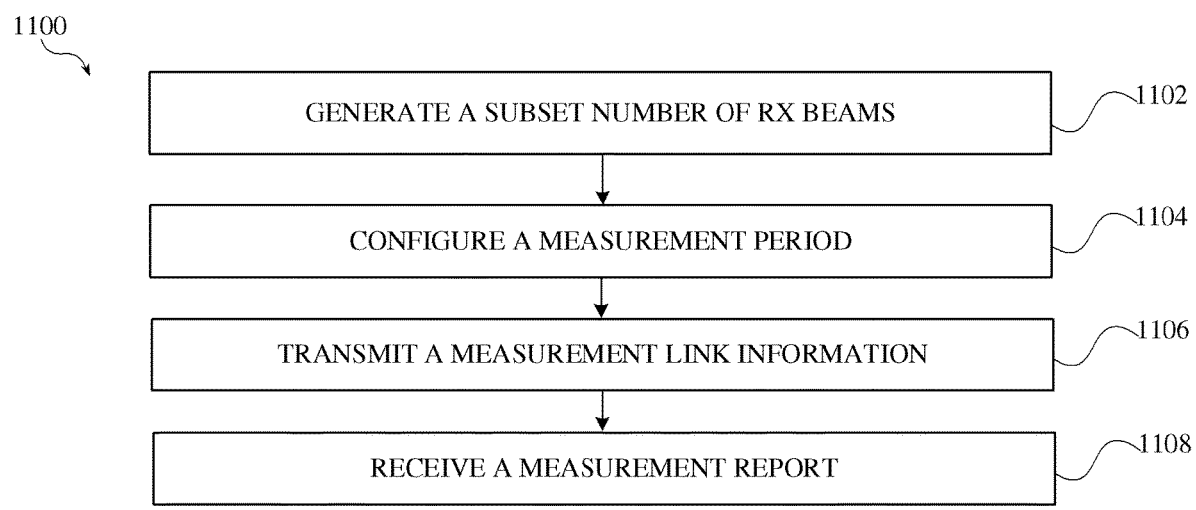
FIG. 11 illustrates a flow diagram of an example method for enhanced radio resource management (RRM) measurements according to a measurement period based on quasi-co-located (QCLed) resources of a serving base station (BS) and neighboring BS.

FIG. 11 illustrates a flow diagram of an example method 1000 for enhanced RRM measurements according to a measurement period based on QCLed resources of a serving BS and neighboring BS. The example method 1100 may be performed, for example, by the serving BS 111a of FIG. 5.

At 1102, the method includes generating a measurement configuration or measurement link information indicating L3 SSBs of a neighboring BS that are QCLed with a RS of the serving BS and configuring a number of Rx beams based on a number of TCI states associated with the neighboring BS. FIG. 5 at 502 corresponds to some aspects of act 1102.

At 1104, the method includes configuring a measurement period based on a number of Rx beams or a number of TCI states associated with the neighboring BS. FIG. 5 at 504 corresponds to some aspects of act 1104.

At 1106, the method includes transmitting the measurement link information. FIG. 5 at 506 corresponds to some aspects of act 1106.

At 1108, the method includes receiving a measurement report comprising RRM measurements corresponding to the L3 SSBs QCLed with the RS. FIG. 5 at 514 corresponds to some aspects of act 1108.

Figure 12:
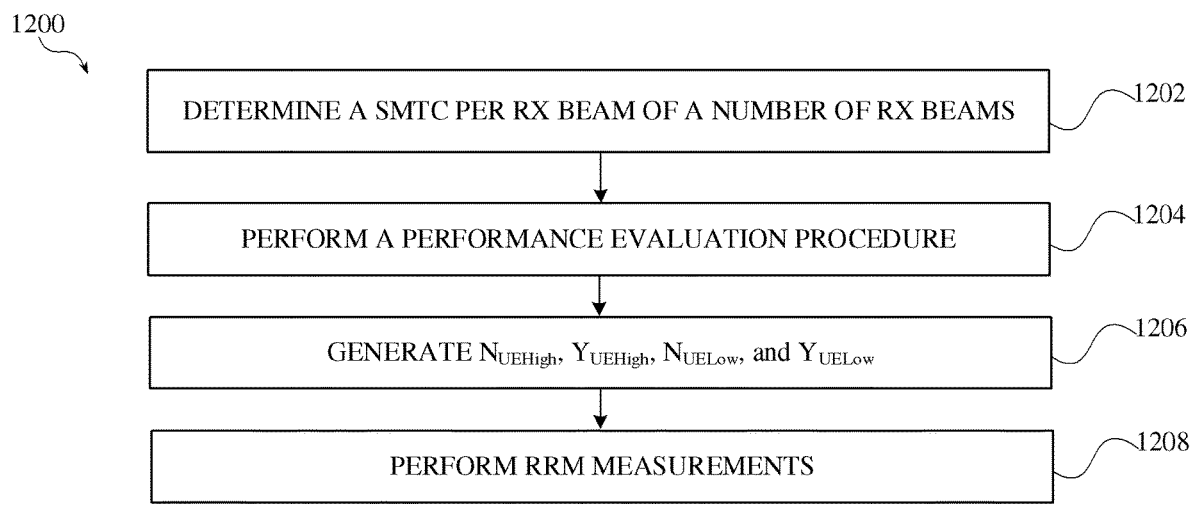
FIG. 12 illustrates a flow diagram of an example method for enhanced radio resource management (RRM) measurements based on receive (Rx) beam prioritization.

FIG. 12 illustrates a flow diagram of an example method 1200 for enhanced RRM measurements based on Rx beam prioritization. The example method 1200 may be performed, for example, by the UE 101 of FIG. 6.

At 1202, the method includes determining a number of SMTCs per Rx beam of a number of Rx beams. The SMTCs 702 of FIG. 6 corresponds to some aspects of act 1202.

At 1204, the method includes performing a performance evaluation procedure. The performance evaluation procedure of FIG. 6 corresponds to some aspects of act 1204.

At 1206, the method includes generating, based on the performance evaluation procedure, a $N_{UEHigh}$ of N, an $Y_{UEHigh}$ of Y, $N_{UELow}$ of N, and $Y_{UELow}$ of Y. The high priority beams 602 and low priority beams 604 of FIGS. 6 and 7, and the decreased number of SMTCs denoted by 706, the number of SMTCs 702, and the increased number of SMTCs denoted by 704 of FIG. 7 correspond to some aspects of act 1206.

At 1208, the method includes performing RRM measurements according to at least one of the $Y_{UEHigh}$ per $N_{UEHigh}$ or according to the $Y_{UELow}$ per $N_{UELow}$. FIGS. 6 and 7 correspond to some aspects of act 1208.

Figure 13:
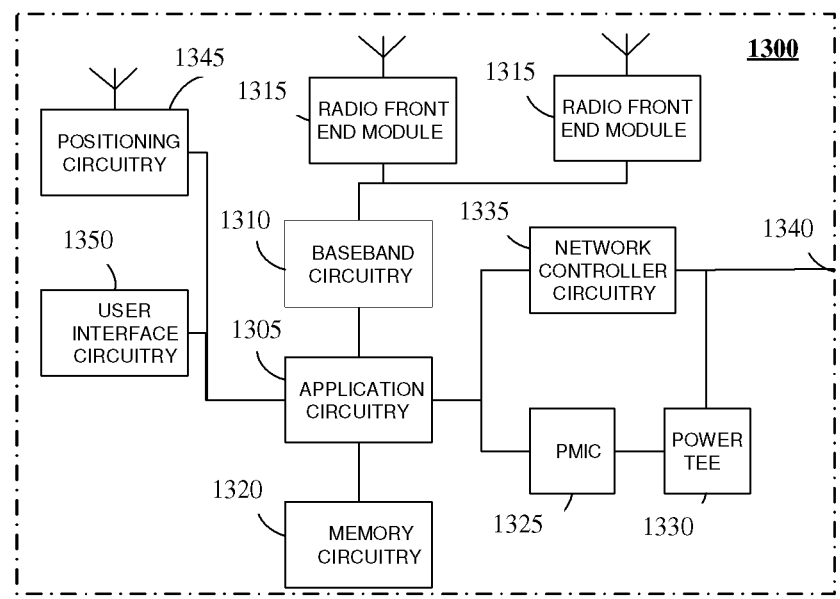
FIG. 13 illustrates an example of an infrastructure equipment, in accordance with various aspects disclosed.

FIG. 13 illustrates an example of infrastructure equipment 1300 in accordance with various aspects. The infrastructure equipment 1300 (or "system 1300") may be implemented as a base station, radio head, RAN node such as the BS 111 of FIG. 1 and/or any other element/component/device discussed herein. In other examples, the system 1300 could be implemented in or by a UE such as UE 101 of FIG. 1. In yet other aspects, some features of the system 1300 could be implemented in or by serving BS 111a or associated serving BS 111b of FIG. 2, 3, 5, or 6

The system 1300 includes application circuitry 1305, baseband circuitry 1310, one or more radio front end modules (RFEMs) 1315, memory circuitry 1320 (including a memory interface), power management integrated circuitry (PMIC) 1325, power tee circuitry 1330, network controller circuitry 1335, network interface connector 1340, satellite positioning circuitry 1345, and user interface 1350. In some aspects, the device of system 1300 may include additional elements/components such as, for example, memory/storage, display, camera, sensor, or input/output) I/O (interface. In other aspects, the components described below may be included in more than one device. For example, said circuitries may be separately included in more than one device for CRAN, vBBU, or other like implementations.

The baseband circuitry 1310 can be used to generate and transmit the measurement link information 208, SSBs, RSs, or other signaling from the serving BS 111a described herein. Baseband circuitry 1310 can be used to receive measurement report 210 or other signaling for the serving BS 111a described herein. Baseband circuitry 1310 can be used to receive the measurement link information 208, or other signaling for the UE 101. Baseband circuitry 1310 can be used to generate and transmit the measurement report 210 or other signaling from the UE 101.

Application circuitry 1305 includes circuitry such as, but not limited to one or more processors (or processor cores), processing circuitry, cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1305 may be coupled with or may include memory/storage elements/components and may be configured to execute instructions stored in the memory/storage to enable various applications or operating systems to run on the system 1300. In some implementations, the memory/storage elements/components may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

Application circuitry 1305 can be used to determine or generate one or more or of the number of Rx beams, the number of SMTCs, the number of high priority Rx beams, the number of low priority Rx beams, the increased number of SMTCs, the decreased number of SMTCs, or the measurement period for the UE 101. Application circuitry 1305 can be used to determine or generate the TCI states, the QCLed relationships between the serving BS 111a and the associated BS 111b, the measurement link information 208, the subset number of Rx beams, the available number of Rx beams, the measurement period, SSBs or RSs for one or more of the serving BS 111a or the associated BS 111b. Memory circuitry 1320 can store one or more of the above features for UE 101, serving BS 111a, or associated BS 111b.

The processor(s) of application circuitry 1305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1305 may comprise, or may be, a special-purpose processor/controller to operate according to the various aspects herein. As examples, the processor(s) of application circuitry 1305 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 1300 may not utilize application circuitry 1305, and instead may include a special-purpose processor/controller to process IP data received from an EPC or 5GC, for example.

User interface 1350 may include one or more user interfaces designed to enable user interaction with the system 1300 or peripheral component interfaces designed to enable peripheral component interaction with the system 1300. User interfaces may include, but are not limited to, one or more physical or virtual buttons) e.g., a reset button (one or more indicators) e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 13 may communicate with one another using interface circuitry, that is communicatively coupled to one another, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 14:
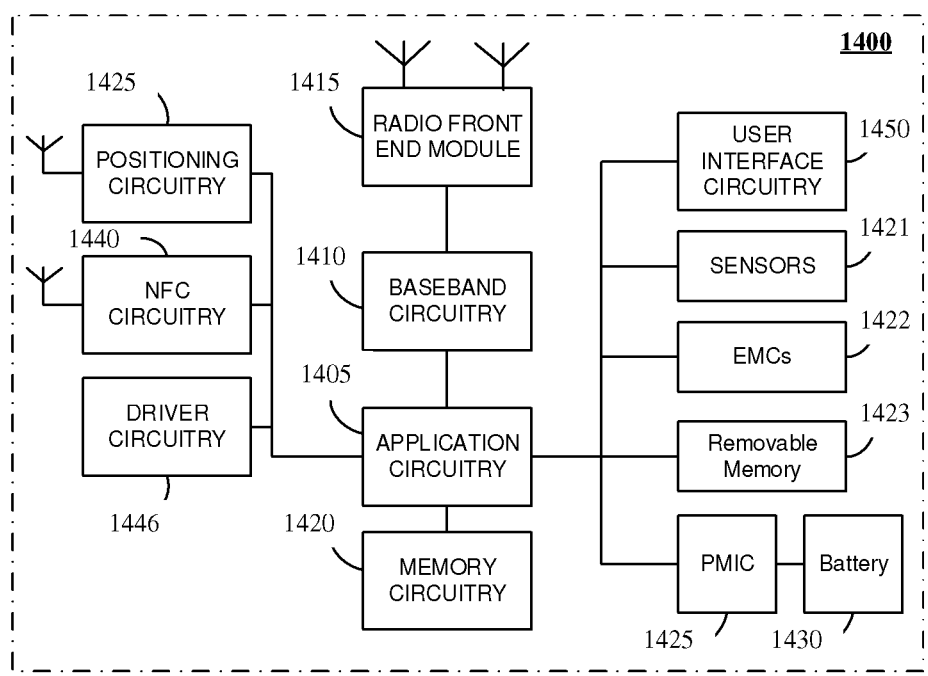
FIG. 14 illustrates an example of a user equipment (UE) or base station (BS) platform, in accordance with various aspects disclosed.

FIG. 14 illustrates an example of a platform 1400 (or "device 1400") in accordance with various aspects. In aspects, the platform 1400 may be suitable for use as the UE 101 of FIG. 1, and/or any other element/component/device discussed herein such as the serving BS 111*a* or the associated BS 111*b* of FIG. 2, 3, 5, or 6. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the platform 1400, or as components otherwise incorporated within a chassis of a larger system. The block diagram of FIG. 14 is intended to show a high level view of components of the platform 1400. However, some of the components shown may be omitted, additional components may be present, and different arrangement of the components shown may occur in other implementations.

Application circuitry 1405 includes circuitry such as, but not limited to one or more processors (or processor cores), memory circuitry 1420 (which includes a memory interface), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1405 may be coupled with or may include memory/storage elements/component and may be configured to execute instructions stored in the memory/storage to enable various applications or operating systems to run on the system 1400. In some implementations, the memory/storage elements/components may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

Application circuitry 1405 can be used to determine or generate one or more or of the number of Rx beams, the number of SMTCs, the number of high priority Rx beams, the number of low priority Rx beams, the increased number of SMTCs, the decreased number of SMTCs, or the measurement period for the UE 101. Application circuitry 1405 can be used to determine or generate the TCI states, the QCLed relationships between the serving BS 111*a* and the associated BS 111*b*, the measurement link information 208, the subset number of Rx beams, the available number of Rx beams, the measurement period, SSBs or RSs for one or more of the serving BS 111*a* or the associated BS 111*b*. Memory circuitry 1420 can store one or more of the above features for UE 101, serving BS 111*a*, or associated BS 111*b*.

As examples, the processor(s) of application circuitry 1405 may include a general or special purpose processor, such as an A-series processor (e.g., the A13 Bionic), available from Apple® Inc., Cupertino, CA or any other such processor. The processors of the application circuitry 1405 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1405 may be a part of a system on a chip (SoC) in which the application circuitry 1405 and other components are formed into a single integrated circuit, or a single package.

The baseband circuitry or processor 1410 may be implemented, for example, as a solder-down substrate including one or more integrated circuits, a single packaged integrated circuit soldered to a main circuit board or a multi-chip module containing two or more integrated circuits. Furthermore, the baseband circuitry or processor 1410 may cause transmission of various resources.

The baseband circuitry 1410 can be used to generate and transmit the measurement link information 208, SSBs, RSs, or other signaling from the serving BS 111*a* described herein. Baseband circuitry 1410 can be used to receive measurement report 210 or other signaling for the serving BS 111*a* described herein. Baseband circuitry 1410 can be used to receive the measurement link information 208, or other signaling for the UE 101. Baseband circuitry 1410 can be used to generate and transmit the measurement report 210 or other signaling from the UE 101.

The platform 1400 may also include interface circuitry (not shown) that is used to connect external devices with the platform 1400. The interface circuitry may communicatively couple one interface to another. The external devices connected to the platform 1400 via the interface circuitry include sensor circuitry 1421 and electro mechanical components (EMCs) 1422, as well as removable memory devices coupled to removable memory circuitry 1423.

A battery 1430 may power the platform 1400, although in some examples the platform 1400 may be mounted deployed in a fixed location, and may have a power supply coupled to an electrical grid. The battery 1430 may be a lithium ion battery, a metal-air battery, such as a zinc-air battery, an aluminum-air battery, a lithium-air battery, and the like. In some implementations, such as in V2X applications, the battery 1430 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium or a non-transitory computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units. The processor or baseband processor can be configured to execute instructions described herein.

A UE or a BS, for example the UE 101 or BS 111 of FIG. 1 can comprise a memory interface and processing circuitry communicatively coupled to the memory interface configured to execute instructions described herein.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

Example 1 is a baseband processor of a user equipment (UE), comprising: one or more processors configured to: receive a measurement link information state link information; determine, from the measurement link information, a number of synchronization signal block based measurement timing configurations (SMTCs) (Y) per Rx beam of a number of receive (Rx) beams (N); generate at least one of a subset number of Rx beams ($N_{UE}$) of the number of Rx beams based on the measurement link information, or an increased number of SMTCs ($Y_{UE}$) of the number of SMTCs corresponding to the number of Rx beams; and perform radio resource management (RRM) measurements according to one or more of the subset number of Rx beams or the increased number of SMTCs.

Example 2 can include Example 1, wherein the RRM measurements are performed according to the subset number of Rx beams and the number of SMTCs.

Example 3 can include Example 1, wherein the RRM measurements are performed according to the subset number of Rx beams and the increased number of SMTCs.

Example 4 can include Example 1, wherein the RRM measurements include layer 3 (L3) measurements; and the one or more processors are further configured to: perform the RRM measurements based on the subset number of Rx beams that correspond to synchronization signal blocks indicated by the measurement link information.

Example 5 can include any of Examples 1-4, wherein the measurement link information indicates layer 3 (L3) synchronization signal blocks (SSBs) of a neighboring base station (BS) that are quasi-co-located (QCLed) with a reference signal (RS) of a serving BS; and the one or more processors are further configured to: perform the RRM measurements based on the L3 SSBs QCLed with the RS.

Example 6 can include any of Examples 1-5, wherein the one or more processors are further configured to: configure beam forming based on synchronization signal blocks indicated by the measurement link information; and perform RRM measurements based on the configured beam forming.

Example 7 can include any of Examples 1-4, wherein the one or more processors are further configured to: perform the RRM measurements according to a total number of SMTCs equal to a product of $N_{UE}$ and $Y_{UE}$ or equal to a product of $N_{UE}$ and Y.

Example 8 is an apparatus configured to be employed in a user equipment (UE), comprising: a memory interface; and processing circuitry configured to: receive a measurement link information indicating layer 3 (L3) synchronization signal blocks (SSBs) of a neighboring base station (BS) that are quasi-co-located (QCLed) with a reference signal (RS) of a serving BS; determine, from the measurement link information, a number of receive (Rx) beams (N); generate a measurement period based on the number of Rx beams; and perform radio resource management (RRM) measurements according to the measurement period and the L3 SSBs QCLed with the RS.

Example 9 can include Example 8, wherein the processing circuitry is further configured to: determine, from the measurement link information, a number of synchronization signal block based measurement timing configurations (SMTCs) (Y) associated with the number of Rx beams, wherein the measurement period is based on the number of SMTCs; and perform RRM measurements based on the number of SMTCs.

Example 10 can include any of Examples 8-9, wherein the processing circuitry is further configured to: generate a subset number of Rx beams ($N_{UE}$) of the number of Rx beams, wherein the measurement period is based on the subset number of Rx beams.

Example 11 can include Example 10, wherein the measurement period is based on the subset number of Rx beams and RRM measurements are performed according to the subset number of Rx beams.

Example 12 can include Example 10, wherein the measurement period is based on the number of Rx beams and RRM measurements are performed according to the subset number of Rx beams.

Example 13 can include Example 10, wherein the processing circuitry is further configured to: generate a measurement duration scalar based on the number of Rx beams divided by the subset number of Rx beams; generate, based on the measurement duration scalar, a measurement duration associated with the subset number of Rx beams; and perform the RRM measurements based on the measurement duration.

Example 14 can include any of Examples 9-13, wherein RRM measurements are performed according to a total number of SMTCs based on the number of Rx beams, or the subset number of Rx beams; and further based on the number of SMTCs and the measurement period.

Example 15 is a baseband processor of a user equipment (UE), comprising: one or more processors configured to: determine, a number of synchronization signal block based measurement timing configurations (SMTCs) (Y) per Rx beam of a number of receive (Rx) beams (N); perform a performance evaluation procedure; generate, based on the performance evaluation procedure, a number of high priority Rx beams ($N_{UEHigh}$) of the number of Rx beams, an increased number of SMTCs ($Y_{UEHigh}$) of the number of SMTCs, a number of low priority Rx beams ($N_{UELow}$) of the number of Rx beams, and a decreased number of SMTCs ($Y_{UELow}$) of the number of SMTCs; and perform radio resource management (RRM) measurements according to at least one of the increased number of SMTCs per the number of high priority Rx beams or according to the decreased number of SMTCs per the number of low priority Rx beams.

Example 16 can include Example 15, wherein a determined total number of SMTCs is based on a product of N and Y, and a generated total number of SMTCs is based on a product of $N_{UEHigh}$ and $Y_{UEHigh}$ plus a product of $N_{UELow}$ and $Y_{UELow}$, wherein the generated total number of SMTCs is equal to the determined number of SMTCs; and the one or more processors are further configured to perform the RRM measurements according to the generated total number of SMTCs.

Example 17 can include Example 15, wherein a number of high priority SMTCs is based on a product of $N_{UEHigh}$ and $Y_{UEHigh}$, and a number of low priority SMTCs is based on a product of $N_{UELow}$ and $Y_{UELow}$; and the number of high priority SMTCs is more than the number of low priority SMTCs.

Example 18 can include Example 15, wherein the one or more processors are further configured to: determine that a performance criteria is satisfied by a total number of Rx beams comprising at least $N_{UEHigh}$ that is less than N based on the performance evaluation procedure; and perform the RRM measurements according to a generated total number of SMTCs based on at least a product of $N_{UEHigh}$ and $Y_{UEHigh}$.

Example 19 can include Example 18, wherein the generated total number of SMTCs is less than a determined total number of SMTCs based on a product of N and Y.

Example 20 can include any of Examples 15-19, wherein the performance evaluation procedure includes a power analysis of the UE, and the one or more processors are further configured to: determine the number of low priority Rx beams based on the power analysis and reduce a total number of measurement occasions of the RRM measurements based on the power analysis.

Example 21 can include any of Example 15-19, wherein a priority of the number of high priority Rx beams and a priority of the number of low priority Rx beams are determined based on at least one of an orientation of the UE, a motion of the UE, crowdsourcing information, or a reflection coefficient of Rx beams of the UE.

Example 22 is an apparatus configured to be employed in a Base Station (BS), comprising: a memory interface; and processing circuitry configured to: generate a measurement link information indicating layer 3 (L3) SSBs of a neighboring BS that are quasi-co-located (QCLed) with a reference signal (RS) of the BS; configure a measurement period based on a number of receive (Rx) beams (N) and a number of TCI states associated with the neighboring BS; transmit the measurement link information comprising an indication of the number of Rx beams; and receive a measurement report comprising radio resource management (RRM) measurements corresponding to the L3 SSBs QCLed with the RS.

Example 23 is a method for performing, by a User Equipment (UE), beam measurements, the method comprising: receiving measurement link information comprising an indication of a component carrier (CC) of a serving base station (BS) quasi-co-located (QCLed) with transmit (Tx) beams of an associated BS determine, from the measurement link information, a L1 RSRP measurement configuration associated with the associated BS; and perform beam sweeps comprising L1 RSRP measurements on Tx beams of the associated BS and Tx beams of the serving BS.

Example 24 can include Example 23, wherein a number of the beam sweeps for the Tx beams of the serving BS are reduced based on L1 RSRP measurements of the associated BS that are QCLed with the serving BS.

Example 25, can include Example 24, further comprising performing beam refinement on Tx beams of the serving BS based on L1 RSRP measurements of the associated BS that are QCLed with the serving BS.

A method as substantially described herein with reference to each or any combination substantially described herein, comprised in examples 1-25, and in the Detailed Description.

A non-transitory computer readable medium as substantially described herein with reference to each or any combination substantially described herein, comprised in examples 1-25, and in the Detailed Description.

A wireless device configured to perform any action or combination of actions as substantially described herein, comprised in examples 1-25, and in the Detailed Description.

An integrated circuit configured to perform any action or combination of actions as substantially described herein, comprised in examples 1-25, and in the Detailed Description.

An apparatus configured to perform any action or combination of actions as substantially described herein, comprised in examples 1-25, and in the Detailed Description.

A baseband processor configured to perform any action or combination of actions as substantially described herein, comprised in examples 1-25, and in the Detailed Description.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communication media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal or apparatus.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

The present disclosure is described with reference to the attached drawing figures, wherein like reference numerals are used to refer to like elements or components throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable or non-transitory computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used herein, the term "circuitry" can refer to, be part of, or include an Application Specific Integrated Circuit) ASIC (an electronic circuit, a processor) shared, dedicated, or group), or associated memory) shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor comprising one or more processors, the one or more processors configured to:
receive a measurement link information indicating a layer 3 (L3) synchronization signal block (SSB) of a neighboring base station (BS) that are quasi-co-located (QCLed) with a reference signal (RS) of a serving BS;
determine, from the measurement link information, a number of receive (Rx) beams;
generate a measurement period based on the number of Rx beams; and
perform a radio resource management (RRM) measurement according to the measurement period and the L3 SSB QCLed with the RS.

2. The baseband processor of claim 1, wherein the one or more processors are further configured to:
determine, from the measurement link information, a number of synchronization signal block based measurement timing configurations (SMTCs) (Y) associated with the number of Rx beams, wherein the measurement period is based on the number of SMTCs; and
perform the RRM measurement based on the number of SMTCs.

3. The baseband processor of claim 1, wherein the one or more processors are further configured to:
generate a subset number of Rx beams ($N_{UE}$) of the number of Rx beams, wherein the measurement period is based on the subset number of Rx beams.

4. The baseband processor of claim 3, wherein the measurement period is based on the subset number of Rx beams and the RRM measurement is performed according to the subset number of Rx beams.

5. The baseband processor of claim 3, wherein the measurement period is based on the number of Rx beams and the RRM measurement is performed according to the subset number of Rx beams.

6. The baseband processor of claim 3, wherein the one or more processors are further configured to:
generate a measurement duration scalar based on the number of Rx beams divided by the subset number of Rx beams;
generate, based on the measurement duration scalar, a measurement duration associated with the subset number of Rx beams; and
perform the RRM measurement based on the measurement duration.

7. The baseband processor of claim 3, wherein the RRM measurement is performed according to a total number of SMTCs based on the number of Rx beams, or the subset number of Rx beams; and further based on the number of SMTCs and the measurement period.

8. A User Equipment (UE), the UE comprising:
a memory; and
one or more processors coupled to the memory, wherein the one or more processors are configured to:
receive a measurement link information indicating a synchronization signal blocks (SSB) of a neighboring base station (BS) that are quasi-co-located (QCLed) with a reference signal (RS) of a serving BS;
determine, from the measurement link information, a number of receive (Rx) beams;
generate a measurement period based on the number of Rx beams; and
perform a radio resource management (RRM) measurement according to the measurement period and the SSB QCLed with the RS.

9. The UE of claim 8, wherein the one or more processors are further configured to:
determine, from the measurement link information, a number of synchronization signal block based measurement timing configurations (SMTCs) (Y) associated with the number of Rx beams, wherein the measurement period is based on the number of SMTCs; and
perform RRM measurement based on the number of SMTCs.

10. The UE of claim 8, wherein the one or more processors are further configured to:
generate a subset number of Rx beams ($N_{UE}$) of the number of Rx beams, wherein the measurement period is based on the subset number of Rx beams.

11. The UE of claim 10, wherein the measurement period is based on the subset number of Rx beams and the RRM measurement is performed according to the subset number of Rx beams.

12. The UE of claim 10, wherein the measurement period is based on the number of Rx beams and the RRM measurement is performed according to the subset number of Rx beams.

13. The UE of claim 10, wherein the one or more processors are further configured to:
generate a measurement duration scalar based on the number of Rx beams divided by the subset number of Rx beams;
generate, based on the measurement duration scalar, a measurement duration associated with the subset number of Rx beams; and
perform the RRM measurement based on the measurement duration.

14. The UE of claim 10, wherein the RRM measurement is performed according to a total number of SMTCs based on the number of Rx beams, or the subset number of Rx beams; and further based on the number of SMTCs and the measurement period.

15. The UE of claim 8, wherein the one or more processors are further configured to:
transmit, by a radio frequency (RF) circuitry, a measurement report, wherein the measurement report is based on the RRM measurement.

16. A method for a User Equipment (UE), the method comprising:
receiving a measurement link information indicating a synchronization signal block (SSB) of a neighboring base station (BS) that are quasi-co-located (QCLed) with a reference signal (RS) of a serving BS;
determining, from the measurement link information, a number of receive (Rx) beams;
generating a measurement period based on the number of Rx beams; and
performing a radio resource management (RRM) measurement according to the measurement period and the SSBs QCLed with the RS.

17. The method of claim 16, further comprising:
determining, from the measurement link information, a number of synchronization signal block based measurement timing configurations (SMTCs) (Y) associated with the number of Rx beams, wherein the measurement period is based on the number of SMTCs; and performing RRM measurement based on the number of SMTCs.

18. The method of claim 16, further comprising:

generating a subset number of Rx beams ($N_{UE}$) of the number of Rx beams, wherein the measurement period is based on the subset number of Rx beams.

19. The method of claim 18, wherein the measurement period is based on the subset number of Rx beams and the RRM measurement is performed according to the subset number of Rx beams.

20. The method of claim 18, wherein the measurement period is based on the number of Rx beams and the RRM measurement is performed according to the subset number of Rx beams.

* * * * *